United States Patent
Chandukutty et al.

(10) Patent No.: US 11,392,560 B2
(45) Date of Patent: Jul. 19, 2022

(54) CONSOLIDATING AND TRANSFORMING METADATA CHANGES

(71) Applicant: Oracle International Corporation, Redwood Shores, CA (US)

(72) Inventors: Rajesh Chandukutty, Kozhikode (IN); Raghu Kotikannikadanam Seshadri, Bangalore (IN); Siddharthan Elamathi, Chennai (IN); Pratish Ganguly, Bangalore (IN); Samir Satpathy, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 959 days.

(21) Appl. No.: 15/268,466

(22) Filed: Sep. 16, 2016

(65) Prior Publication Data
US 2017/0091295 A1    Mar. 30, 2017

(30) Foreign Application Priority Data

Sep. 28, 2015    (IN) .............................. 5148CHE2015

(51) Int. Cl.
*G06F 16/21*        (2019.01)
(52) U.S. Cl.
CPC .................................. *G06F 16/213* (2019.01)
(58) Field of Classification Search
CPC ...... G06F 17/2247; G06F 16/84; G06F 16/80; G06F 16/81; G06F 16/116; G06F 16/25; G06F 16/258; G06F 16/20; G06F 16/22; G06F 16/322; G06F 16/9017; G06F 16/9024; G06F 16/2435; G06F 16/355; G06F 16/90328; G06F 16/27; G06F 16/213; G06F 16/243; G06Q 10/10

USPC .............. 707/803, 999.1, E17.127, E17.006, 707/E17.123, E17.124, 999.101, 999.103, 707/999.107, E17.012, E17.055, E17.126, 707/E17.129, E17.131, 741, 756, 804,
(Continued)

(56) References Cited

U.S. PATENT DOCUMENTS

| 6,662,188 | B1 * | 12/2003 | Rasmussen | ........... | G06F 16/289 |
|           |      |         |           |             | 707/999.102 |
| 6,901,403 | B1 * | 5/2005  | Bata      | ........................ | G06F 16/26 |

(Continued)

OTHER PUBLICATIONS

Patching Document Content or Metadata retrieved from Mark Logic Server Chapter. May 3, 2017 https://docs.marklogic.com/guide/node-dev/partial-update.

*Primary Examiner* — Alford W Kindred
*Assistant Examiner* — Cecile H Vo
(74) *Attorney, Agent, or Firm* — Kilpatrick Townsend & Stockton LLP

(57) ABSTRACT

Techniques for patching metadata content in a base repository are disclosed. Techniques can include customizing, by a computer including a processor and a memory, metadata content in an existing base repository, consolidating the metadata content customized in the existing base repository into a consolidated customization file, obtaining a new version of a base repository, transforming the metadata content in the consolidated customization file in accordance with the new version of the base repository and applying the transformed metadata content to the new version of the base repository. Transformation can be performed in response to metadata content being renamed, recreated and deleted.

20 Claims, 16 Drawing Sheets

(58) Field of Classification Search
USPC ... 707/999.003, E17.032, E17.044, E17.045, 707/E17.082, 713, 718, 719, 602, 615, 707/634, 638, 695
See application file for complete search history.

(56) References Cited

U.S. PATENT DOCUMENTS

| | | | |
|---|---|---|---|
| 7,028,058 B2 | 4/2006 | Russon | |
| 7,529,745 B2 | 5/2009 | Ahluwalia et al. | |
| 8,065,672 B2 | 11/2011 | Sriram et al. | |
| 8,346,723 B2 | 1/2013 | Gonzalez | |
| 8,752,015 B2 | 6/2014 | Basak et al. | |
| 8,966,465 B2 | 2/2015 | Konduri | |
| 9,031,901 B1* | 5/2015 | King | G06F 16/93 |
| | | | 707/602 |
| 9,910,665 B2* | 3/2018 | Haferkorn | G06F 8/656 |
| 2002/0120598 A1* | 8/2002 | Shadmon | G06F 16/81 |
| 2005/0234984 A1 | 10/2005 | Rogerson et al. | |
| 2006/0085465 A1* | 4/2006 | Nori | G06F 16/213 |
| 2007/0203956 A1 | 8/2007 | Anderson et al. | |
| 2011/0246422 A1* | 10/2011 | Gonzalez | G06F 16/27 |
| | | | 707/634 |
| 2011/0295870 A1* | 12/2011 | Bolsius | G06Q 10/10 |
| | | | 707/765 |
| 2012/0233547 A1* | 9/2012 | McLachlan | G06Q 10/06 |
| | | | 715/764 |
| 2013/0085991 A1* | 4/2013 | Welden | G06F 16/213 |
| | | | 707/634 |
| 2015/0033216 A1 | 1/2015 | Appadurai | |
| 2017/0091295 A1* | 3/2017 | Chandukutty | G06F 16/213 |
| 2019/0050445 A1* | 2/2019 | Griffith | G06F 16/213 |

* cited by examiner

```
<PhysicalTable name="REVENUE_F" parentName=""Sample".."""
parentId="3023:6" parentUid="c0000000-f677-15bc-98ff-0af56d1a0000" id="3001:368"
uid="c0000000-f748-15bc-98ff-0af56d1a0000">...</PhysicalTable>
<PhysicalTable name="PRODUCTS" parentName=""Sample".."""
parentId="3023:6" parentUid="c0000000-f677-15bc-98ff-0af56d1a0000" id="3001:39" uid="c0000021-
f677-15bc-98ff-0af56d1a0000">...</PhysicalTable>
<PhysicalTable name="OFFICES" parentName=""Sample".."""
parentId="3023:6" parentUid="c0000000-f677-15bc-98ff-0af56d1a0000" id="3001:28" uid="c0000016-
f677-15bc-98ff-0af56d1a0000">...</PhysicalTable>
<PhysicalTable name="REVENUE" parentName=""Sample".."""
parentId="3023:6" parentUid="c0000000-f677-15bc-98ff-0af56d1a0000" id="3001:8" uid="c0000002-
f677-15bc-98ff-0af56d1a0000">...</PhysicalTable>
...
<PhysicalColumn name="Attribute_1" parentName=""Sample"..."PRODUCTS""
parentId="3001:39" parentUid="c0000021-f677-15bc-98ff-0af56d1a0000" id="3003:47"
uid="c0000029-f677-15bc-98ff-0af56d1a0000" dataType="VARCHAR" precision="30" extName="//
Table/SAMP_PRODUCTS_D/ATTRIBUTE_1" rowCount="0.0" specialType="none">
</PhysicalColumn>
<PhysicalColumn name="Attribute_2" parentName=""Sample"..."PRODUCTS""
parentId="3001:39" parentUid="c0000021-f677-15bc-98ff-0af56d1a0000" id="3003:42"
uid="c0000024-f677-15bc-98ff-0af56d1a0000" dataType="VARCHAR" precision="30" extName="//
Table/SAMP_PRODUCTS_D/ATTRIBUTE_2" rowCount="0.0" specialType="none">
</PhysicalColumn>
...
<LogicalTable name="PRODUCTS" parentName=""core"" parentId="2000:326"
parentUid="00000000-f6d8-15bc-98ff-0af56d1a0000" id="2035:343" uid="c0000000-f6e0-15bc-98ff-
0af56d1a0000">...</LogicalTable>
<LogicalTable name="OFFICES" parentName=""core"" parentId="2000:326"
parentUid="00000000-f6d8-15bc-98ff-0af56d1a0000" id="2035:329" uid="00000000-f6e0-15bc-98ff-
0af56d1a0000">...</LogicalTable>
<LogicalTable name="Revenue" parentName=""core"" parentId="2000:326"
parentUid="00000000-f6d8-15bc-98ff-0af56d1a0000" id="2035:383" uid="40000000-f781-15bc-98ff-
0af56d1a0000">...</LogicalTable>
...
<LogicalColumn name="Attribute_1" parentName=""core".."PRODUCTS""
parentId="2035:343" parentUid="c0000000-f6e0-15bc-98ff-0af56d1a0000" id="2006:346"
uid="c0000002-f6e0-15bc-98ff-0af56d1a0000" isWriteable="false">
<LogicalColumn name="Attribute_2" parentName=""core".."PRODUCTS""
parentId="2035:343" parentUid="c0000000-f6e0-15bc-98ff-0af56d1a0000" id="2006:347"
uid="c0000003-f6e0-15bc-98ff-0af56d1a0000" isWriteable="false">
...
```

```
<LogicalTableSource name="PRODUCTS"
parentName=""core"."PRODUCTS"" parentId="2035:343"
parentUid="c0000000-f6e0-15bc-98ff-0af56d1a0000" id="2037:345" uid="c0000001-f6e0-15bc-
98ff-0af56d1a0000" isActive="true">
<Link><RefPhysicalTable id="3001:39" uid="c0000021-f677-15bc-98ff-0af56d1a0000"
qualifiedName=""Sample"..."PRODUCTS""/>
</Link>
...
<ColumnMapping><RefLogicalTableSource id="2037:345" uid="c0000001-f6e0-15bc-98ff-
0af56d1a0000"
qualifiedName=""core"."PRODUCTS"."PRODUCTS""/>
<LogicalColumn><Expr><![CDATA["core"."PRODUCTS"."Attribute_1"]]></Expr></LogicalColumn>
<Expr><![CDATA["Sample".""."".".""."PRODUCTS"."Attribute_1"]]></Expr></ColumnMapping>
<ColumnMapping><RefLogicalTableSource id="2037:345" uid="c0000001-f6e0-15bc-98ff-
0af56d1a0000"
qualifiedName=""core"."PRODUCTS"."PRODUCTS""/>
<LogicalColumn><Expr><![CDATA["core"."PRODUCTS"."Attribute_2"]]></Expr></LogicalColumn>
<Expr><![CDATA["Sample".""."".".""."PRODUCTS"."Attribute_2"]]></Expr></ColumnMapping>
....
<PresentationTable name="PRODUCTS" parentName=""core"."""
parentId="4004:451" parentUid="40000032-f801-15bc-98ff-0af56d1a0000" id="4008:454"
uid="40000035-f801-15bc-98ff-0af56d1a0000" hasDispName="false"
hasDispDescription="false">
....
<PresentationColumn name="Attribute_1"
parentName=""core".."PRODUCTS"" parentId="4008:454"
parentUid="40000035-f801-15bc-98ff-0af56d1a0000" id="4010:441" uid="40000028-f801-15bc-
98ff-0af56d1a0000" hasDispName="false" hasDispDescription="false"
overrideLogicalName="false">
<RefLogicalColumn id="2006:346" uid="c0000002-f6e0-15bc-98ff-0af56d1a0000"
qualifiedName=""core"."PRODUCTS"."Attribute_1""/></
PresentationColumn>
<PresentationColumn name="Attribute_2"
parentName=""core".."PRODUCTS"" parentId="4008:454"
parentUid="40000035-f801-15bc-98ff-0af56d1a0000" id="4010:442" uid="40000029-f801-15bc-
98ff-0af56d1a0000" hasDispName="false" hasDispDescription="false"
overrideLogicalName="false">
<RefLogicalColumn id="2006:347" uid="c0000003-f6e0-15bc-98ff-0af56d1a0000"
qualifiedName=""core"."PRODUCTS"."Attribute_2""/>
</PresentationColumn>
```

*FIG. 2B*

```xml
<FINEGRAINED> //Contains all the modifications for existing base repository objects.
<PhysicalColumn
fullyQualifiedName=""Sample"..."PRODUCTS"."Product_Additiona
l_Details"" id="3003:42" name="Product_Additional_Details"
old_fullyQualifiedName=""Sample"..."PRODUCTS"."Attribute_2&q
uot;" old_name="Attribute_2" uid="c0000024-f677-15bc-98ff-0af56d1a0000"/>
<PhysicalColumn
fullyQualifiedName=""Sample"..."PRODUCTS"."Product_Internal_i
d"" id="3003:47" name="Product_Internal_id"
old_fullyQualifiedName=""Sample"..."PRODUCTS"."Attribute_1&q
uot;" old_name="Attribute_1" uid="c0000029-f677-15bc-98ff-0af56d1a0000"/>
<PhysicalKey
fullyQualifiedName=""Sample"..."REVENUE_F"."Cust_Key""
id="3008:381" uid="c000000d-f748-15bc-98ff-0af56d1a0000"><Columns><RefPhysicalColumn
id="3003:374"
qualifiedName=""Sample"..."REVENUE_F"."Prod_Key""
uid="c0000006-f748-15bc-98ff-0af56d1a0000"/></Columns></PhysicalKey>
<LogicalTable fullyQualifiedName=""core"."OFFICES"" id="2035:329"
uid="00000000-f6e0-15bc-98ff-0af56d1a0000">...</LogicalTable>
<LogicalTable fullyQualifiedName=""core"."PRODUCTS"" id="2035:343"
uid="c0000000-f6e0-15bc-98ff-0af56d1a0000">...</LogicalTable>
<PresentationTable fullyQualifiedName=""core"..."OFFICES""
id="4008:453" uid="40000034-f801-15bc-98ff-
0af56d1a0000"><Columns><RefPresentationColumn after="40000027-f801-15bc-98ff-
0af56d1a0000" before=" " id="4010:459"
qualifiedName=""core"..."OFFICES"."Address_Details""
uid="80000001-3cc4-15be-8003-0af56d1a0000"/>
<RefPresentationColumn after="40000026-f801-15bc-98ff-0af56d1a0000" before="80000001-
3cc4-15be-8003-0af56d1a0000" id="4010:440" uid="40000027-f801-15bc-98ff-0af56d1a0000"/
>
</Columns>
</PresentationTable>
<PresentationTable fullyQualifiedName=""core"..."PRODUCTS""
id="4008:454" uid="40000035-f801-15bc-98ff-
0af56d1a0000"><Columns><RefPresentationColumn after="4000001b-f801-15bc-98ff-
0af56d1a0000" before=" " id="4010:464"
qualifiedName=""core"..."PRODUCTS"."Product_Group""
uid="40000002-408c-15be-922a-0af56d1a0000"/>
<RefPresentationColumn after="40000031-f801-15bc-98ff-0af56d1a0000" before="40000002-
408c-15be-922a-0af56d1a0000" id="4010:428" uid="4000001b-f801-15bc-98ff-0af56d1a0000"/
>
</Columns>
</PresentationTable>
</FINEGRAINED>
```

```
<DECLARE>
<PhysicalColumn name="Product_Group"
parentName=""Sample"..."PRODUCTS"" parentId="3001:39"
parentUid="c0000021-f677-15bc-98ff-0af56d1a0000" id="3003:460" uid="40000000-407c-15be-
922a-0af56d1a0000" dataType="VARCHAR" precision="100" extName="Product_Group"
specialType="none"></PhysicalColumn>
<PhysicalColumn name="Address_Details"
parentName=""Sample"..."OFFICES"" parentId="3001:28"
parentUid="c0000016-f677-15bc-98ff-0af56d1a0000" id="3003:455" uid="c0000001-3cb9-15be-
8003-0af56d1a0000" dataType="VARCHAR" precision="1000" extName="Address Details"
specialType="none"></PhysicalColumn>
<LogicalColumn name="Address_Details" parentName=""core"."OFFICES""
parentId="2035:329" parentUid="00000000-f6e0-15bc-98ff-0af56d1a0000" id="2006:457"
uid="40000001-3cc3-15be-8003-0af56d1a0000" isWriteable="false">...</LogicalColumn>
<LogicalColumn name="Product_Group" parentName=""core"."PRODUCTS""
parentId="2035:343" parentUid="c0000000-f6e0-15bc-98ff-0af56d1a0000" id="2006:462"
uid="80000002-4089-15be-922a-0af56d1a0000" isWriteable="false">...</LogicalColumn>
<PresentationColumn name="Address_Details"
parentName=""core".."OFFICES"" parentId="4008:453"
parentUid="40000034-f801-15bc-98ff-0af56d1a0000" id="4010:459" uid="80000001-3cc4-15be-
8003-0af56d1a0000" hasDispName="false" hasDispDescription="false"
overrideLogicalName="false">...</PresentationColumn>
<PresentationColumn name="Product_Group"
parentName=""core".."PRODUCTS"" parentId="4008:454"
parentUid="40000035-f801-15bc-98ff-0af56d1a0000" id="4010:464" uid="40000002-408c-15be-
922a-0af56d1a0000" hasDispName="false" hasDispDescription="false"
overrideLogicalName="false">...</PresentationColumn>
<ColumnMapping><RefLogicalTableSource id="2037:331" uid="00000001-f6e0-15bc-98ff-
0af56d1a0000" qualifiedName=""core"."OFFICES"."OFFICES""/>
<LogicalColumn><Expr><![CDATA["core"."OFFICES"."Address_Details"]]></Expr></LogicalColumn>
<Expr><![CDATA["Sample".""."".""OFFICES"."Address_Details"]]></Expr></ColumnMapping>
<ColumnMapping><RefLogicalTableSource id="2037:345" uid="c0000001-f6e0-15bc-98ff-
0af56d1a0000"
qualifiedName=""core"."PRODUCTS"."PRODUCTS""/>
<LogicalColumn><Expr><![CDATA["core"."PRODUCTS"."Attribute_1"]]></Expr></LogicalColumn>
<Expr><![CDATA["Sample".""."".""PRODUCTS"."Product_Internal_id"]]></Expr></ColumnMapping>
<ColumnMapping><RefLogicalTableSource id="2037:345" uid="c0000001-f6e0-15bc-98ff-
0af56d1a0000"
qualifiedName=""core"."PRODUCTS"."PRODUCTS""/>
<LogicalColumn><Expr><![CDATA["core"."PRODUCTS"."Attribute_2"]]></Expr>
<Expr><![CDATA["Sample".""."".""PRODUCTS"."Product_Additional_Details"]]></Expr></
ColumnMapping>
<ColumnMapping><RefLogicalTableSource id="2037:345" uid="c0000001-f6e0-15bc-98ff-
0af56d1a0000"
qualifiedName=""core"."PRODUCTS"."PRODUCTS""/>
<LogicalColumn><Expr><![CDATA["core"."PRODUCTS"."Product_Group"]]></Expr></LogicalColumn>
<Expr><![CDATA["Sample".""."".""PRODUCTS"."Product_Group"]]></Expr></ColumnMapping>
</DECLARE>
```

*FIG. 5B*

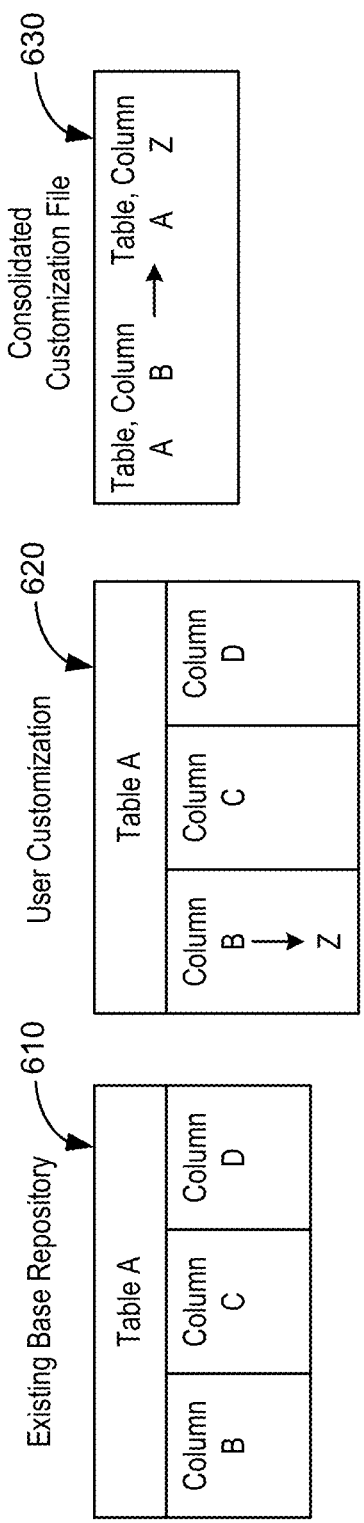

```
<PhysicalTable name="OFFICE_DETAILS" parentName=""Sample".."""
parentId="3023:6" parentUid="c0000000-f677-15bc-98ff-0af56d1a0000" id="3001:28"
uid="c0000016-f677-15bc-98ff-0af56d1a0000" type="none" x="298" y="638" rowCount="0.0"
uri="VALUEOF(NQ_SESSION.SERVICEINSTANCEROOT)/data/SAMP_OFFICES_D.xml"
maxConn="0">

<PhysicalTable name="PRODUCTS" parentName=""Sample".."""
parentId="3023:6" parentUid="c0000000-f677-15bc-98ff-0af56d1a0000" id="3001:468"
uid="00000001-40c2-15be-922a-0af56d1a0000" type="none" x="258" y="642" rowCount="0.0"
uri="VALUEOF(NQ_SESSION.SERVICEINSTANCEROOT)/data/SAMP_PRODUCTS_D.xml"
maxConn="0">

- <PhysicalTable name="REVENUE_F" parentName=""Sample".."""
parentId="3023:6" parentUid="c0000000-f677-15bc-98ff-0af56d1a0000" id="3001:368"
uid="c0000000-f748-15bc-98ff-0af56d1a0000">...</PhysicalTable>
```

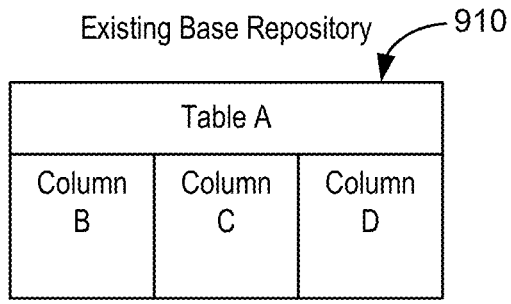
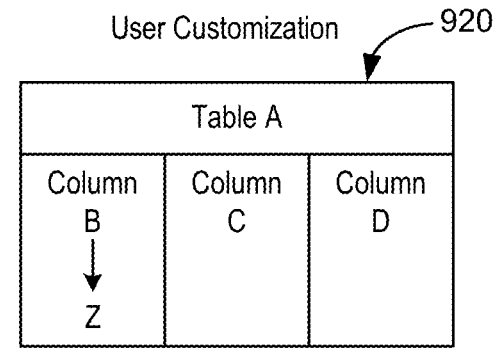
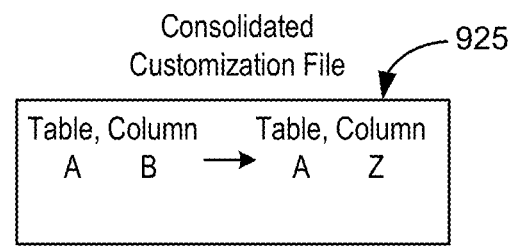
FIG. 9A
FIG. 9B
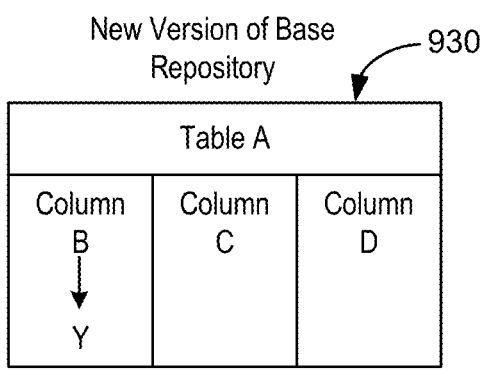
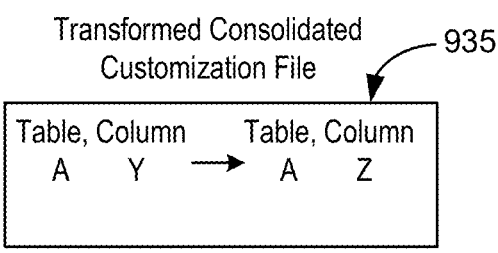
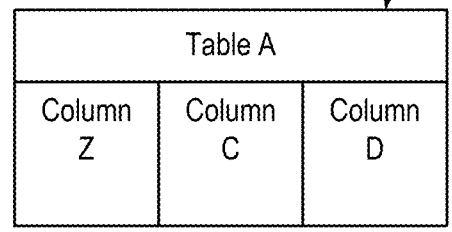
FIG. 9C
FIG. 9D

```
- <PhysicalKey
    fullyQualifiedName='"Sample"..."REVENUE_F".."Cust_Key"'
    id='3008:381'
    uid='c000000d-f748-15bc-98ff-0af56d1a0000'
  />
  <Columns>
    <RefPhysicalColumn
      id='3003:374'
      qualifiedName='"Sample"..."REVENUE_F".."Prod_Key"'
      uid='c0000006-f748-15bc-98ff-0af56d1a0000'
    />
  </Columns>
  </PhysicalKey>
```

FIG. 10

```xml
<PhysicalColumn    fullyQualifiedName='"Sample"..."PRODUCTS"."Product_Additional_Details"'
id='3003:42'
name='Product_Additional_Details'    old_fullyQualifiedName='"Sample"..."PRODUCTS"."Attribute_2"'
old_name='Attribute_2'
- uid='c0000024-f677-15bc-98ff-0af56d1a0000'
+ uid='00000007-40c2-15be-922a-0af56d1a0000'
/>
<PhysicalColumn    fullyQualifiedName='"Sample"..."PRODUCTS"."Product_Internal_id"'
id='3003:47'
name='Product_Internal_id'    old_fullyQualifiedName='"Sample"..."PRODUCTS"."Attribute_1"ot;'
old_name='Attribute_1'
- uid='c0000029-f677-15bc-98ff-0af56d1a0000'
+ uid='00000011-40c2-15be-922a-0af56d1a0000'
/>
<PhysicalColumn
dataType='VARCHAR'
extName='Product_Group'
id='3003:460'
name='Product_Group'
parentId='3001:39'
parentName='"Sample"..."PRODUCTS"'
- parentUid='c0000021-f677-15bc-98ff-0af56d1a0000'
+ parentUid='00000001-40c2-15be-922a-0af56d1a0000'
precision='100'
specialType='none'
- uid='40000000-407c-15be-922a-0af56d1a0000'
></PhysicalColumn>
```

*FIG. 11*

CONSOLIDATING AND TRANSFORMING METADATA CHANGES

CROSS REFERENCE TO RELATED APPLICATION

This application claims the benefit of India Provisional Application No. 5148CHE2015 filed on Sep. 28, 2015 in the India Patent Office, entitled "CONSOLIDATING AND TRANSFORMING METADATA CHANGES," the disclosure of which is incorporated by reference herein in its entirety.

BACKGROUND

The present disclosure relates generally to the efficient patching of metadata. Specifically, techniques disclosed provide for the customization of metadata, consolidating the customizations and transforming the customizations for the efficient patching of a base repository of an application.

Packaged application solutions, such as enterprise applications, may contain out-of-the-box data fields. Applications can be distributed across various product families such as human capital management, customer relationship management, supply chain management, procurement, governance, and project portfolio products. These out-of-the-box data fields would be mapped with an out-of-the-box base repository, such as a metadata base repository supplied by an application. The application can be, for example, an analytics platform and can include an interactive dashboard, ad hoc queries, mobile analytics, notifications and alerts, integrated systems management, etc.

The base repository can also be known as, for example, a metadata base repository, a metadata repository, a base artifact or a metadata base artifact. In, for example, an application package, data fields would be mapped to their back-end database and reports can be generated with the modeled metadata repository provided in the package. However, these out-of-the-box data fields provided by the application may not be sufficient for a customer's needs.

As a customer's data grows, new data fields would be required for enhancing the reports. As a result, the factory packaged base repository provided by the applications needs to be extended and/or needs to be customized per a customer's needs. As a result, each time a new version of factory packaged metadata repository is shipped with the application, the customer specific customizations need to be performed on the new version of the base repository. That is, customizations that were made by the user would need to be made again on the new version in order for the new version of the base repository to include the customer customizations.

Further, when there are issues with patching metadata (e.g., applying the customizations to the new version of the base repository), the issues are resolved by using pre-defined conflict resolution rules or the metadata is corrected after patching is performed which can result in loss of information. Therefore, such patching processes are inefficient, time consuming and costly.

BRIEF SUMMARY

The example embodiments provide techniques (including methods, systems, devices, code or computer program stored on a computer-readable non-transitory memory and comprising instructions executable by one or more processors) for customizing, consolidating and transforming metadata changes for, for example, a base repository.

In accordance with some embodiments, a method can include customizing, by a computer including a processor and a memory, metadata content in an existing base repository, consolidating the metadata content customized in the existing base repository into a consolidated customization file, obtaining a new version of a base repository, transforming the metadata content in the consolidated customization file in accordance with the new version of the base repository, and applying the transformed metadata content to the new version of the base repository.

In accordance with some embodiments, in response to metadata content being renamed in the new version of the base repository, the transforming the metadata content in the consolidated customization file includes updating a name of metadata content in the consolidated customization file.

In accordance with some embodiments, in response to metadata content being recreated in the new version of the base repository, the transforming the metadata content in the consolidated customization file includes updating a unique ID of the metadata content in the consolidated customization file.

In accordance with some embodiments, in response to metadata content being deleted in the new version of the base repository, the transforming the metadata content in the consolidated customization file includes removing references to the deleted metadata content in the consolidated customization file.

In accordance with some embodiments, the method can include validating the transformed metadata content before applying the transformed metadata content to the new version of the base repository.

In accordance with some embodiments, the method can include saving the validated transformed metadata content in a transformed consolidated customization file.

In accordance with some embodiments, applying the transformed metadata content to the new version of the base repository includes applying the transformed consolidated customization file to the new version of the base repository.

In accordance with some embodiments, the updating the name of metadata content in the consolidated customization file includes searching for metadata content according to a unique identification (ID) of the metadata content that is renamed and updating the name of the metadata content in the consolidated customization file corresponding to the unique ID.

In accordance with some embodiments, the updating the unique ID of metadata content in the consolidated customization file includes searching for instances of a previous unique ID of the metadata content in the consolidated customization file according to a fully qualified name of the metadata content, and updating the previous unique ID to an updated unique ID of the metadata content.

In accordance with some embodiments, the removing deleted content in the consolidated customization file includes identifying metadata content in the consolidated customization file that is deleted in the new version of the base repository and removing references to the deleted metadata content in the consolidated customization file.

In accordance with some embodiments, the metadata content includes an object.

In accordance with some embodiments, metadata content in the new version of the base repository is different from the metadata content in the existing base repository.

In accordance with some embodiments, metadata content in the new version of the base repository is an update to the metadata content in the existing base repository.

In accordance with some embodiments, metadata content in the consolidated customization file is transformed in accordance with the new version of the base repository.

In accordance with some embodiments, the consolidated customization file includes only information regarding customizations made on the existing base repository.

In accordance with some embodiments, the consolidated customization file includes customizations in the order in which the customizations were performed.

In accordance with some embodiments, the metadata content is automatically transformed in accordance with the new version of the base repository In accordance with some embodiments, a non-transitory computer-readable storage medium storing a plurality of instructions executable by one or more processors, the plurality of instructions including customizing, by a computer including a processor and a memory, metadata content in an existing base repository, consolidating the metadata content customized in the existing base repository into a consolidated customization file, obtaining a new version of a base repository; transforming the metadata content in the consolidated customization file in accordance with the new version of the base repository, and applying the transformed metadata content to the new version of the base repository.

In accordance with some embodiments, a system includes one or more processors; and a memory coupled with and readable by the one or more processors, the memory configured to store a set of instructions which, when executed by the one or more processors, causes the one or more processors to: customize metadata content in an existing base repository, consolidate the metadata content customized in the existing base repository into a consolidated customization file; obtain a new version of a base repository, transform the metadata content in the consolidated customization file in accordance with the new version of the base repository, and apply the transformed metadata content to the new version of the base repository.

Certain embodiments are directed to systems, portable consumer devices, and computer readable media associated with the methods described herein.

A better understanding of the nature and advantages of the example embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which:

FIGS. 2A and 2B illustrate portions of an existing base repository file, in accordance with some example embodiments.

FIGS. 5A and 5B illustrate portions of a consolidated customization file, in accordance with some example embodiments.

FIGS. 6A, 6B, and 6C illustrate the creation of a consolidated customization file, in accordance with some example embodiments.

FIG. 7 illustrates portions of a file for a new version of a base repository, in accordance with some example embodiments.

FIGS. 9A, 9B, 9C and 9D illustrate the customization of a new version of a base repository, in accordance with some example embodiments.

FIG. 10 illustrates portions of a transformed consolidated customization file, in accordance with some example embodiments.

FIG. 11 illustrates differences between a consolidated customization file and a transformed consolidated customization file, in accordance with some example embodiments.

DETAILED DESCRIPTION

Figure 1:
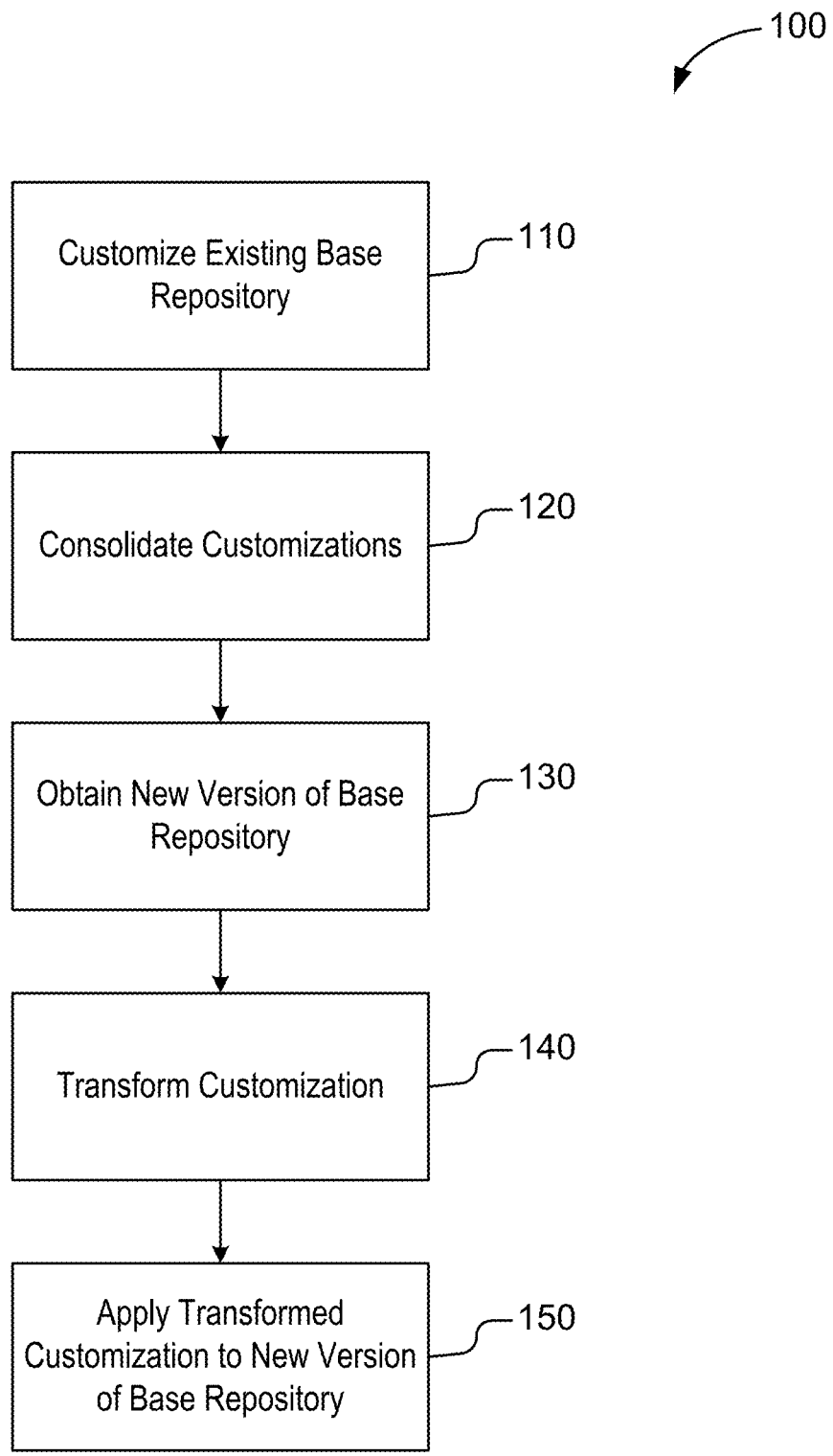
FIG. 1 illustrates a flowchart for creating and applying customizations to a base repository, in accordance with some example embodiments.

In the following description, for the purposes of explanation, specific details are set forth in order to provide a thorough understanding of the exemplary embodiments. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

In accordance with some example embodiments, a patching process for patching metadata in, for example, a base repository can be performed faster and more easily. Further, issues with patching, such as resolution of conflicts and loss of information are resolved efficiently. Patching can include making changes to metadata of the base repository. In an example embodiment, metadata content, such as objects, can be renamed, recreated, and/or deleted. An object can refer to a metadata object stored in a repository, such as, Physical table, column etc.

In accordance with some example embodiments, there is provided a process of creating a single consolidated list of customizations to metadata, such as metadata objects, that are made by a customer to an existing base metadata repository. The customizations are consolidated into, for example, a single consolidated customization file. The consolidated customization file can also be called a list. When a new version of the base repository is obtained, the consolidated customizations are transformed in accordance with the metadata in the new version of the base repository.

When a customer customizes the existing base repository, the changes will be segregated and captured. The changes can be merged into a consolidated customization file. Throughout the specification, the terms changes and customizations may be used interchangeably. By having the changes (e.g., customizations) consolidated, an efficient patching process can be performed. Specifically, patching can be performed faster and more easily. Further, issues with patching, such as resolution of conflicts and loss of information are resolved efficiently.

The list of all changes contains only the changes done on each object, thereby reducing the conflicts. That is, the information from an existing base repository will not conflict with information from a new version of a base repository. The transformation process alters the customization to ensure correctness of customizations and prevents loss of information. When customizations are applied on a new base repository, if the customizations are not transformed as per the new base repository, they still hold references to the old values that would not exist in the new base repository. When such customizations are not applied, this may result in a loss of information.

In accordance with some example embodiments, customer specific customizations for a base repository, such as a business intelligence metadata repository, can be preserved and can be patched on top of a new version of the base repository. Therefore, the customizations made to a previous version of the base repository can be preserved and patching can be easily performed. Further, since a single consolidated customization file is created, a single patch can be performed on a new version of a base repository instead of, for example, a series of patches or multiple patches for all of the customizations.

A new version of a base repository that is to be patched with the customizations may have changed the metadata objects that were customized by the customer. Therefore, in an example embodiment, the customizations made by a user are transformed according to the new version of the base repository. Further, the transformed customizations can be validated and altered in order to ensure that the customizations are compatible with the new version of the base repository. After validating the transformed customizations, the customizations can be applied to the new version of the base repository.

In an example embodiment, the process can include a combination of consolidation and transformation. However, this is merely an example, and the order and steps of the process can be modified and steps in addition to consolidation and transformation can be performed.

Further, although the examples describe a base repository, such as a business intelligence application base repository, the example embodiments can be applied in other implementations where metadata objects can be represented with a type, a fully qualified name and/or a unique ID. A fully qualified name refers to the complete name for a specific object in the tree hierarchy. For example, a column in a table can be represented as <DatabaseName>.<SchemaName>.<Table>.<Column>. Although the customization of object is described, the example embodiments can also apply to the customization of other types of metadata in an application.

FIG. 1 illustrates a flowchart of a method 100 for creating and applying customizations to a base repository, in accordance with some example embodiments.

At step 110, of FIG. 1, a user may make customizations to an existing base repository. A user can include, for example, companies, customer, administrators, etc., who use the application. The base repository is an existing base repository since it is the base repository that is currently being used by a user. A base repository can also be known as, for example, a metadata base repository, a metadata repository, a base artifact or a metadata base artifact. A repository is a collection of metadata objects. Products are often shipped with a predefined repository containing predefined metadata, this repository can be a base repository. Customers customize this base repository further to their needs, these changes are called customizations. With subsequent releases, repositories are provided with new additions/updates/changes, referred to as a new version of a base repository.

FIGS. 2A and 2B illustrate a portion 200 of an existing base repository file, in accordance with some example embodiments. FIGS. 2A and 2B illustrate a partial extract of the XML representation of the base repository. There is an extract of physical tables, physical columns, the logical tables, columns, how the column mapping from logical to physical layer and the presentation layer objects. A user can make customizations to the base repository in accordance with the user's needs.

Figure 3:
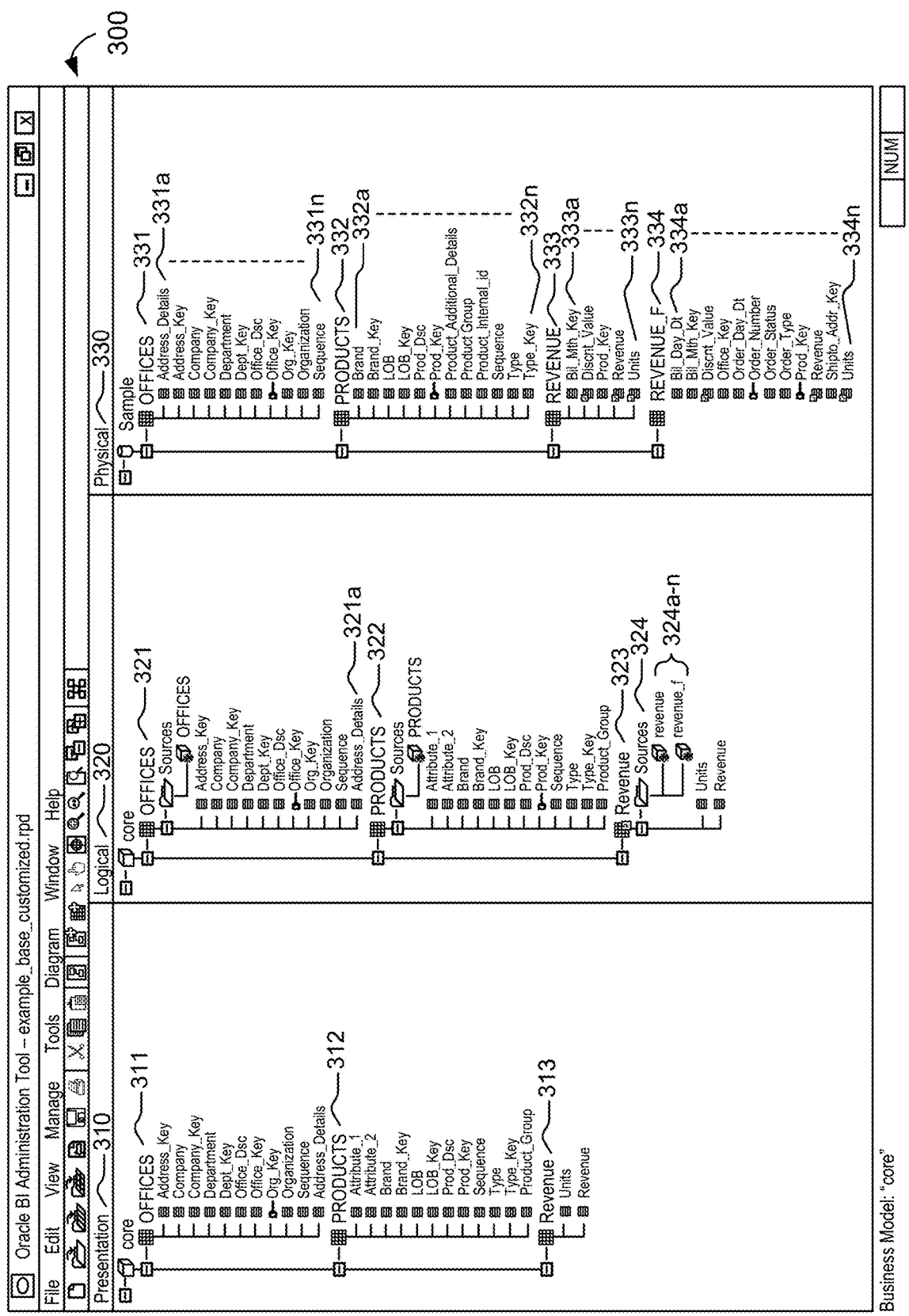
FIG. 3 illustrates a user interface for performing metadata customization, in accordance with some example embodiments.

FIG. 3 illustrates a user interface 300 for performing metadata customization, in accordance with some example embodiments. As shown in FIG. 3, a base repository, as opened on a user interface 300, can include, for example, three layers. The three layers of the base repository are shown in the user interface 300 of FIG. 3. The three layers can include a physical layer 330, a logical layer 320 and a presentation layer 310. The logical layer allows the user to create the business model mapping. The physical layer is used for importing data, physical joins, etc. and represents physical data. The logical layer allows for creating the logical mapping for the physical layer objects representing the business model The presentation layer allows creating the presentation hierarchy. Each of these layers can include metadata objects, such as, "Address_Key," "Company," etc. The objects defined in each of these layers can be related. Also, the metadata objects within each of the layers can be in a hierarchy as shown with, for example, table Revenue 323. The layers of metadata can be modified via the user interface 300.

The physical layer 330 can include, for example, four tables. The four tables can correspond to OFFICES 331, PRODUCTS 332, REVENUE 333, and REVENUE F 334. Each of the tables can include columns. For example, table OFFICES 331 can include columns 331a-n, table PRODUCTS 332 can include columns 332a-n, table REVENUE 333 can include columns 333a-n, and table REVENUE F 334 can include columns 334a-n. These tables and columns in the physical layer 330 are related to the tables and columns in the logical layer 320 (e.g., Business Model and Mapping Layer) and the presentation layer 310. The tables and columns shown in FIG. 3 are merely examples and the example embodiments are not limited to the example shown in FIG. 3. Tables and columns can vary according to the particular business application being used.

The object can be represented by the following XML representations. The XML representation shows the attributes for the objects in the base repository.

```
<PhysicalTable name="OFFICES" parentName=""Sample".."""
parentId="3023:6" parentUid="c0000000-f677-15bc-98ff-0af56d1a0000" id="3001.28"
uid="c0000016-f677-15bc-98ff-0af56d1a0000" >
<LogicalTable name="OFFICES" parentName=""core"" parentId="2000:326"
```

```
parentUid="00000000-f6d8-15bc-98ff-0af56d1a0000" id="2035:329" uid="00000000-f6e0-
15bc-98ff-0af56d1a0000">
<TableSources><RefLogicalTableSource id="2037:331" uid="00000001-f6e0-15bc-98ff-
0af56d1a0000"
qualifiedName="quot;core"."OFFICES"."OFFICES""/>
</TableSources></LogicalTable>
<LogicalTableSource name="OFFICES"
parentName=""core"."OFFICES"" parentId="2035:329"
parentUid="00000000-f6e0-15bc-98ff-0af56d1a0000" id="2037:331" uid="00000001-f6e0-
15bc-98ff-0af56d1a0000" isActive="true"><Link><StartNode> <RefPhysicalTable
id="3001:28" uid="c0000016-f677-15bc-98ff-0af56d1a0000"
qualifiedName=""Sample"..."OFFICES""/></StartNode></Link>
```

When a user of the existing base repository makes customizations to the base repository, the customizations can be stored in a layer above the base repository. That is, customizations are stored separately and can be applied on top of base repository in order to obtain a customized repository.

In the example shown in FIG. 3, the user makes the following customizations to the existing base repository:

1. Creates a new physical column called "Address_Details" 331a under the physical table OFFICES 331.

```
<PhysicalColumn name="Address_Details"
arentName=""Sample"..."
OFFICES"" parentId="3001:28"
parentUid="c0000016-f677-15bc-98ff-0af56d1a0000" id="3003:455"
uid="c0000001-3cb9-15be-8003-0af56d1a0000"
dataType="VARCHAR"> </PhysicalColumn>
```

2. Creates a new logical column called "Address_Details" 321a under logical table OFFICES 321.

```
<LogicalColumn name="Address_Details" parentName=
""core"."OFFICES""
parentId="2035:329"
parentUid="00000000-f6e0-15bc-98ff-0af56d1a0000" id="2006:457"
uid="40000001-3cc3-15be-8003-0af56d1a0000" isWriteable="false">
```

3. Updates the relationship for the new column "Address_Details" 331a from Physical layer 330 to Logical layer 320. The relationship can be updated using a metadata modeling user interface such as Admintool.

```
<ColumnMapping> <RefLogicalTableSource id="2037:331"
uid="00000001-f6e0-15bc-98ff-0af56d1a0000"
qualifiedName=""core"."
OFFICES"."OFFICES""/>
<LogicalColumn><Expr>
<![CDATA["core"."OFFICES"."Address_Details"]]></Expr>
<Objects><RefObject id="2006:457"
uid="40000001-3cc3-15be-8003-0af56d1a0000"
qualifiedName=""core"."
OFFICES"."Address_Details""/>
</Objects></LogicalColumn>...</ColumnMapping>
```

4. Adds a new physical column called "Product_Group" under the physical layer 330 table PRODUCTS 332 and the logical layer 320 table PRODUCTS 322 and the corresponding mapping is updated. This can be performed using a metadata modeling user interface such as Admintool.

```
<PhysicalColumn
fullyQualifiedName=""Sample"..."PRODUCTS"
."Product_Additional_Details"" id="3003:42"
name="Product_Additional_Details"
old_fullyQualifiedName=""Sample"..."
PRODUCTS"."Attribute_2""
old_name="Attribute_2"
uid="c0000024-f677-15bc-98ff-0af56d1a0000"/>
```

5. Renames the physical layer 330 columns "Attribute_1" and "Attribute_2" under physical layer 330 table PRODUCTS 332 as per their data source. The following renaming is performed: Attribute_1→"Product_Internal_id" and Attribute_2→"Product_Additional_Details". FIG. 3 shows the repository after this user action. The renamed columns are shown in physical layer 330.

6. Changes the Key defined for table REVENUE_F 334 of physical table 330.

Referring to FIG. 1, after each of the customizations are made to an existing base repository, at step 120, the customizations (for example, after each of customizations 1-6 discussed above) that were made by the user can be captured and consolidated. Each customization can be recorded as a set of finegrained changes and consolidated into a customization file. The customizations can be consolidated in, for example, a consolidated customization file.

Figure 4:
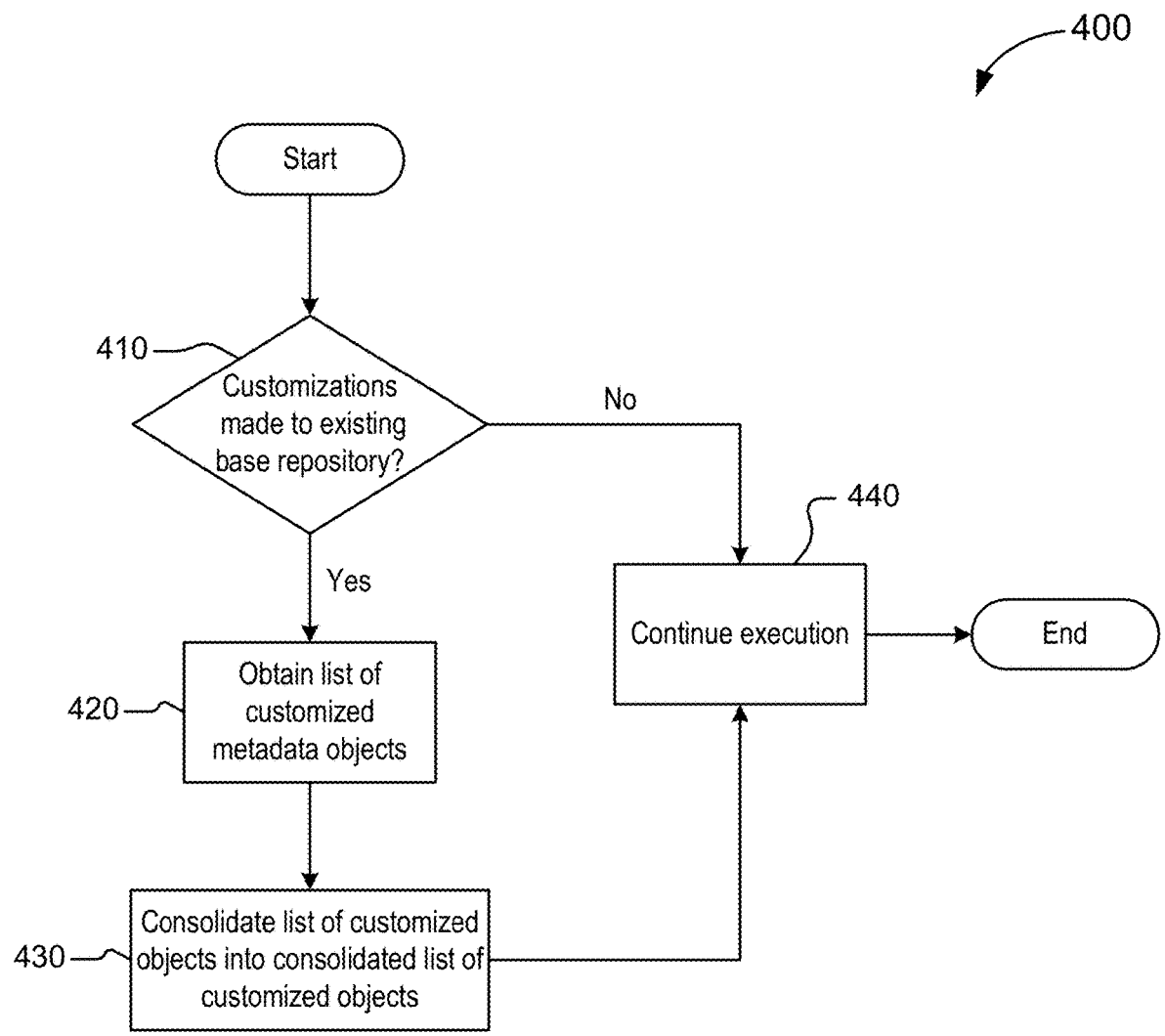
FIG. 4 illustrates a flowchart of customizing and consolidating metadata changes, in accordance with some example embodiments.

FIG. 4 illustrates a flowchart of customizing and consolidating metadata changes, in accordance with some example embodiments. At step 410, it is determined whether customizations are made to an existing base repository. If no customizations are made, then execution of the application can continue at step 440. That is, processes that consume the metadata can continue to execute. If one or more customizations are made to the existing base repository, at step 420 one or more transactional files can be obtained. Each of the transactional files can indicate a particular customization. Each transaction file can include one or more customizations. Customizations can be layered and/or grouped. Each layer and/or group can be contained in separate files.

At step 430, the list of customizations are consolidated into, for example, a consolidated customization file. Subsequent customizations are consolidated into cumulative changes in the same order in which these changes were done. The consolidated customized metadata objects in the consolidated customization file can represent all the customizations performed on the existing base repository. In the list of customizations, each object would contain, for example, only the changes instead of whole object's definition. This can help minimize the amount of content being stored and well as helps during consolidation.

FIGS. 5A and 5B illustrate portions 500 of a consolidated customization file, in accordance with some example embodiments. A customer customizes the existing base repository and after each step, the changes are consolidated into one customization file (e.g., customizations xml). FIGS. 5A and 5B illustrate portions from the consolidated customization file.

After consolidation of the customizations is performed and a consolidated customization file is created at step 430, the process can proceed to step 440 and continue execution of the application. The customization and consolidation can be performed during runtime of an application.

FIGS. 6A, 6B, and 6C illustrate the creation of a consolidated customization file, in accordance with some example embodiments. The example shown in FIGS. 6A, 6B, and 6C is for purposes of explanation and is a generalization of a table and its corresponding columns. More specific examples of tables and their corresponding columns are shown in, for example, FIG. 3.

As shown in FIG. 6A, table 610 can be a Table A. Table A can include columns B, C, and D. In FIG. 6B, a user has made a customization to the existing base repository. That is, a user has made a customization to a column in the table. As shown in table 620, the user has changed the name of column B to column Z.

FIG. 6C illustrates a consolidated customization file 630. All of the customizations that were made by a user are consolidated into a single file. Although a single customization (column B changed to column Z) is shown in FIG. 6C, one or more customizations can be included in the consolidated customization file. For example, customizations such as recreation of metadata and deletion of metadata can also be performed in addition to the renaming of metadata described in FIGS. 6A-6C.

Referring back to FIG. 1, after the customizations made by a user are consolidated at 120, at step 130, a new version of a base repository may be obtained. For example, a new version of an application, such as a business intelligence application, is shipped which contains a new version of the base repository. On, for example, upgrade, the existing version of the base repository (e.g., version 1.0) is replaced with a new version of the base repository (e.g., version 2.0). The new version of the base repository can include changes that are different from the existing version of the base repository. Therefore, the metadata in the new version of the base repository may be different from the existing base repository.

A new version of a base repository can include the following changes from the existing base repository:
 1. The physical layer 330 table OFFICES 331 has been renamed to OFFICE_DETAILS
 2. The physical layer 330 table PRODUCTS 332 and the columns under it (e.g., 332a-n) have been re-created, therefore, their unique id (UID) has changed.
 3. The physical layer 330 table REVENUE_F 334 has been deleted.

Therefore, in the new version of the base repository, an object has been renamed and given a different name, objects have been recreated, and an object is deleted. During upgrade, the existing base repository will be replaced with the new version of the base repository.

FIG. 7 illustrates portions of a file of a new version of a base repository, in accordance with some example embodiments. FIG. 7 illustrates changed objects from the existing base repository shown in FIGS. 2A and 2B. As shown in FIG. 7, a name has changed (e.g., name="OFFICE_DETAILS") and a unique ID has changed (uid="00000001-40c2-15be-922a-0af56d1a0000"). Further, an object is deleted (e.g., deleted object REVENUE_F). If the customizations are applied as is, on the new base repository, the end result will miss applying the changes on the PRODUCTS table, and may result in an error while processing references to REVENUE_F table. Also all names referring to table OFFICES will be erroneous.

However, the customizations made by the user were based on the objects of the existing base repository (previous version of the base repository before the new version of the base repository). Therefore, if the customizations that were made by the user to the existing base repository were applied to the new version of the base repository, the customizations may fail or may only be partially applied.

In order to ensure that the customizations that were made by the user to the previous version of the base repository comply with the new version of the base repository, transformation is performed.

Referring back to FIG. 1, at step 140, the customizations that were made by the user can be transformed in accordance with the new version of the base repository. At step 150, the transformed customizations can be applied to the new version of the base repository.

Figure 8:
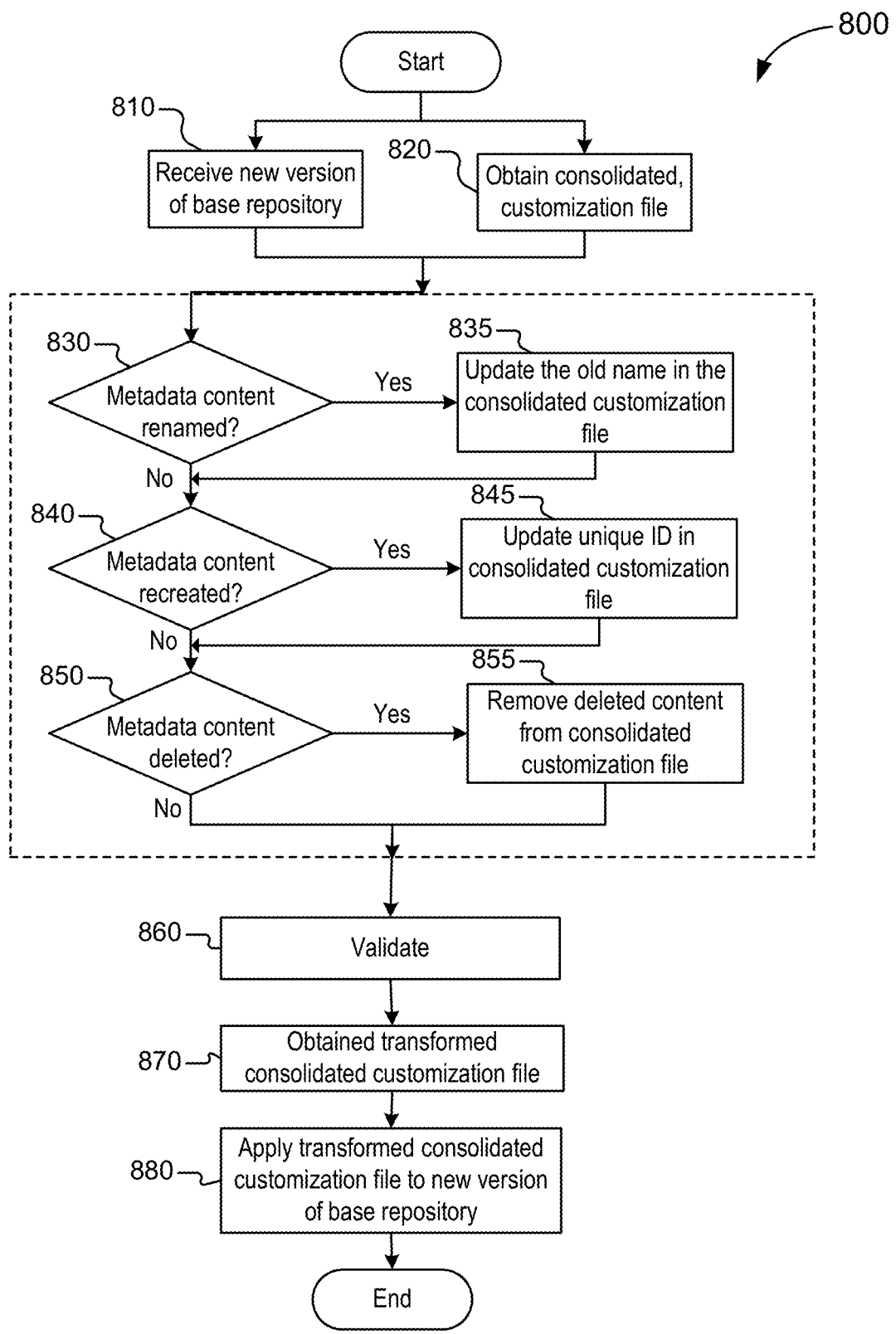
FIG. 8 illustrates a flowchart for transforming metadata, in accordance with some example embodiments.

FIG. 8 illustrates a flowchart of a method 800 of transforming metadata, in accordance with some example embodiments. In the example shown in FIG. 8, a consolidated customization file is transformed and applied to a new version of a base repository.

At step 810, the new version of the base repository is received. For example, an upgraded version of the base repository may be sent to the user. The new version of the base repository may have altered metadata, such as objects, that were customized by the customer.

At step 820, the consolidated customization file is obtained. As discussed above, with respect to, for example, FIGS. 4, 5, and 6, the consolidated customization file includes the customizations that were created by the user in the existing base repository.

At steps 830, 835, 840, 845, 850 and 855, transformation of the metadata objects is performed to ensure that the customizations made by the user are compatible with the new version of the base repository. The new version of the base repository may have altered metadata content, such as objects or fields, etc. Transformation is performed to ensure that the alterations to the metadata content in the new version of the base repository are compatible with the customizations made by the user.

Specifically, at step 830, it is determined whether any of the metadata content in the new version of the base repository has been renamed. Metadata objects in the factory content may be renamed. The content that is renamed can correspond to, for example, content in a field or object level of the metadata. If the metadata content has been renamed in the new version of the base repository, at step 835, the old name corresponding to the metadata content is updated in the consolidated customization file in accordance with the new name used in the new version of the base repository.

Customized metadata objects are looked up according to their unique ID and all occurrences and references to the old name for the object are corrected. The lookup can be performed by the software that applies the customization on the base repository. The name of the content in the consolidated customization file is updated according to the new name of the content in the new version of the base repository. The consolidated customization file would include the consolidated customizations made by the user to the existing base repository in addition to updates made in response to the transformation of the metadata content from the new version of the base repository. Therefore, the name of the content in the consolidated customization file will be compatible with the name of the content in the new version of the base repository. The consolidated customization file can be stored in a file system. The files disclosed in the example embodiments can be stored in a database or remote machine.

The following is an example transformation for renamed content. In the example below, the unique object ID in the consolidated customizations file matches an object's unique ID in the new version of the base repository, but the object name has changed. During transformation, the change in the object name is updated in the consolidated customization file.

Updating the object name in the consolidated customization file can be performed as follows:

```
    <PhysicalColumn
        dataType='VARCHAR'
        extName='Address Details'
        id='3003:455'
        name='Address_Details'
        parentId='3001:28'
-       parentName='"Sample"..."OFFICES"'
+       parentName='"Sample"..."
        OFFICE_DETAILS"'
        parentUid='c0000016-f677-15bc-98ff-0af56d1a0000'
        precision='1000'
        specialType='none'
        uid='c0000001-3cb9-15be-8003-0af56d1a0000'
-       ></PhysicalColumn>
```

At step 840, it is determined whether any of the metadata content in the new version of the base repository has been recreated. Recreating content can refer to any metadata object that has its unique id updated. This can happen when the corresponding object in the repository was deleted and re-created. The content that is recreated can correspond to, for example, content in an object level of the metadata. If the metadata content has been recreated, metadata objects in factory content have a new unique ID.

At step 845, the previous unique ID of the content is updated according to the new updated unique ID. When objects are recreated, the old unique ID would be modified with a new unique ID in the new version of the base repository. In this case, customized metadata objects are looked up with a fully qualified name and all occurrences and references of the old ID of the object are corrected. A fully qualified name has all of the details about an object tree. When metadata objects are read into memory, indexes will be built using a fully qualified name and type. Look up is performed using these indexes.

The unique ID of the content in the consolidated customization file is updated according to the new unique ID of the content in the new version of the base repository. The updates to the consolidated customization file. Therefore, the unique ID of the content in the consolidated customization file will be compatible with the unique ID of the content in the new version of the base repository.

The following is an example transformation for recreated content. In the example below, the type and fully qualified name for the object referred to in the customizations match the object in the base repository, but the unique ID has changed. The difference in the unique ID indicates that the object has been re-created, and the unique ID references are updated.

Updating the unique ID in the consolidated customization file can be performed as follows:

```
    <PhysicalColumn  fullyQualifiedName='"Sample"...
    "PRODUCTS"."Product_Additional_Details"'
        id='3003:42'
        name='Product_Additional_Details'  old_fullyQualifiedName='"
    Sample"..."PRODUCTS"."Attribute_2"'
        old_name='Attribute_2'
-       uid='c0000024-f677-15bc-98ff-0af56d1a0000'
+       uid='00000007-40c2-15be-922a-0af56d1a0000'
        />
    <PhysicalColumn  fullyQualifiedName='"Sample"...
    "PRODUCTS"."Product_Internal_id"'
        id='3003:47'
        name='Product_Internal_id'
    old_fullyQualifiedName='"Sample"..."
    PRODUCTS"."Attribute_1"'
        old_name='Attribute_1'
-       uid='c0000029-f677-15bc-98ff-0af56d1a0000'
+       uid='00000011-40c2-15be-922a-0af56d1a0000'
        />
    <PhysicalColumn
        dataType='VARCHAR'
        extName='Product_Group'
        id='3003:460'
        name='Product_Group'
        parentId='3001:39'
        parentName='"Sample"..."PRODUCTS"'
-       parentUid='c0000021-f677-15bc-98ff-0af56d1a0000'
+       parentUid='00000001-40c2-15be-922a-0af56d1a0000'
        precision='100'
        specialType='none'
        uid='40000000-407c-15be-922a-0af56d1a0000'
-       ></PhysicalColumn>
```

At step 850, it is determined whether metadata content has been deleted. For example, metadata objects in the new version of the base repository may have been deleted. The content that is deleted can correspond to, for example, content at an object level of the metadata. If metadata content has been deleted, at step 855 the references to the deleted content can be removed in the consolidated customization file. All references to the deleted objects are removed from the consolidated customization file that includes the customized metadata objects. Objects to be deleted can exist in the customization file, but the base repository does not reference those objects.

That is, the content in the consolidated customization file is deleted according to the content that is deleted in the new version of the base repository. Since the content no longer exists in the new version of the base repository, the corresponding information will be deleted. Therefore, the consolidated customization file with be consistent with the new version of the base repository.

FIG. 10 illustrates portions of a transformed consolidated customization file, in accordance with some example embodiments. Specifically, removing content in the consolidated customization file is shown in FIG. 10. A table REVENUE_F is deleted, therefore, customizations related to the deleted table REVENUE_F are removed. The customizations are removed since the new version of the base repository cannot find a match for the customizations referring to the table REVENUE_F.

FIG. 11 illustrates differences between a consolidated customization file and a transformed consolidated customization file, in accordance with some example embodiments. The XML differences between the consolidated customizations file and the transformed customizations file is disclosed which illustrates the changes on the metadata after transformation. As shown in FIG. 11, the type and fully qualified name for the object referred to in the customizations match the object in the base repository, but the unique ID has changed. This indicates that the object has been re-created, and the unique id references are updated.

In example embodiments, the customizations that were made by the user can be applied to the new version of the base repository without user action. That is, the user does not have to perform the customizations that the user had previously made to the existing base repository for the new version of the base repository. The customizations that were made by the user will be transformed based on the new version of the base repository.

After transformation of the content is performed, at step 860, the transformations that were performed during, for example, steps 830, 835, 840, 845, 850, and 855 are validated. At the end of altering the customized metadata objects in the consolidated customization file, each of the changes are validated and corrected. For example, deletion of a parent object would result in finding the correct parent and updating the references in child objects. On transformation, customizations get updated and/or deleted and the end result must be a consistent valid set. For example if a table was found deleted, all references to its columns in the customization set should also be deleted. All other metadata objects that referred to the deleted table/columns would need to be updated. Further, the output of transformation must result in a valid customization set without any dangling objects. For example, deleting objects can leave dangling references. Correction is performed by finding and fixing any dangling references.

At step 870, the validated transformed consolidated customization file is obtained. That is, the consolidated customization file is transformed according to any renaming, recreation, and/or deletions and the transformed consolidated customization file is compatible with the new version of the base repository.

At step 880, the transformed consolidated customization file is applied on top of the new version of the base repository. That is, the transformed consolidated customization file is applied as a patch on top of the new version of the base repository.

During transformation, the customizations that were made and stored in the consolidated customization file are automatically updated by inference. The customized content in the consolidated customization file is compared with the new version of the base repository so that customizations will be consistent with the new version of the base repository. Since the customizations from the existing base repository are transformed to be consistent with the metadata content in the new version of the base repository, prior to applying the customizations to the base repository, the customer customizations will be compatible with the new version of the base repository. Further, there is less of a likelihood of conflicts when applying the customizations.

FIGS. 9A, 9B, 9C and 9D illustrate the customization of a new version of a base repository, in accordance with some example embodiments. The example shown in FIGS. 9A, 9B, 9C and 9D is for purposes of explanation and is a generalization of a table and its corresponding columns. More specific examples of tables and their corresponding columns are shown in, for example, FIG. 3.

As shown in FIG. 9A, an existing base repository can include a Table A 910. Table A 910 can include columns B, C, and D. In FIG. 9B, a user has made customizations to the existing base repository. In table A 920, the user has changed the name of column B to column Z. All of the customizations that were made by a user are consolidated into a single file, such as consolidated customization file 925. Although a single customization (column B changed to column Z) is shown in FIG. 9B, one or more customizations can be included in the consolidated customization file. For example, customizations such as recreation of metadata and deletion of metadata can also be performed in addition to the renaming of metadata described in FIGS. 9A-9D.

In FIG. 9C, a new version of the base repository is obtained. In the new version, in table A 930, column B has been renamed to column Y. In accordance with an example embodiment, the customizations made by the user are transformed in accordance with the new version of the base repository. The consolidated customization list 935 in transformed in accordance with changes made in the new version of the base repository as shown in Table A 930. The transformed consolidated customization file 935 includes customizations made by the user as well as updates to any customizations so as to be consistent with the new version of the base repository. As shown in FIG. 9D, the transformed consolidated customization file 935 is applied to the new version of the base repository as shown in Table A 940. Table A 940 incorporates the changes from the transformed consolidated customization file 935.

Figure 12:
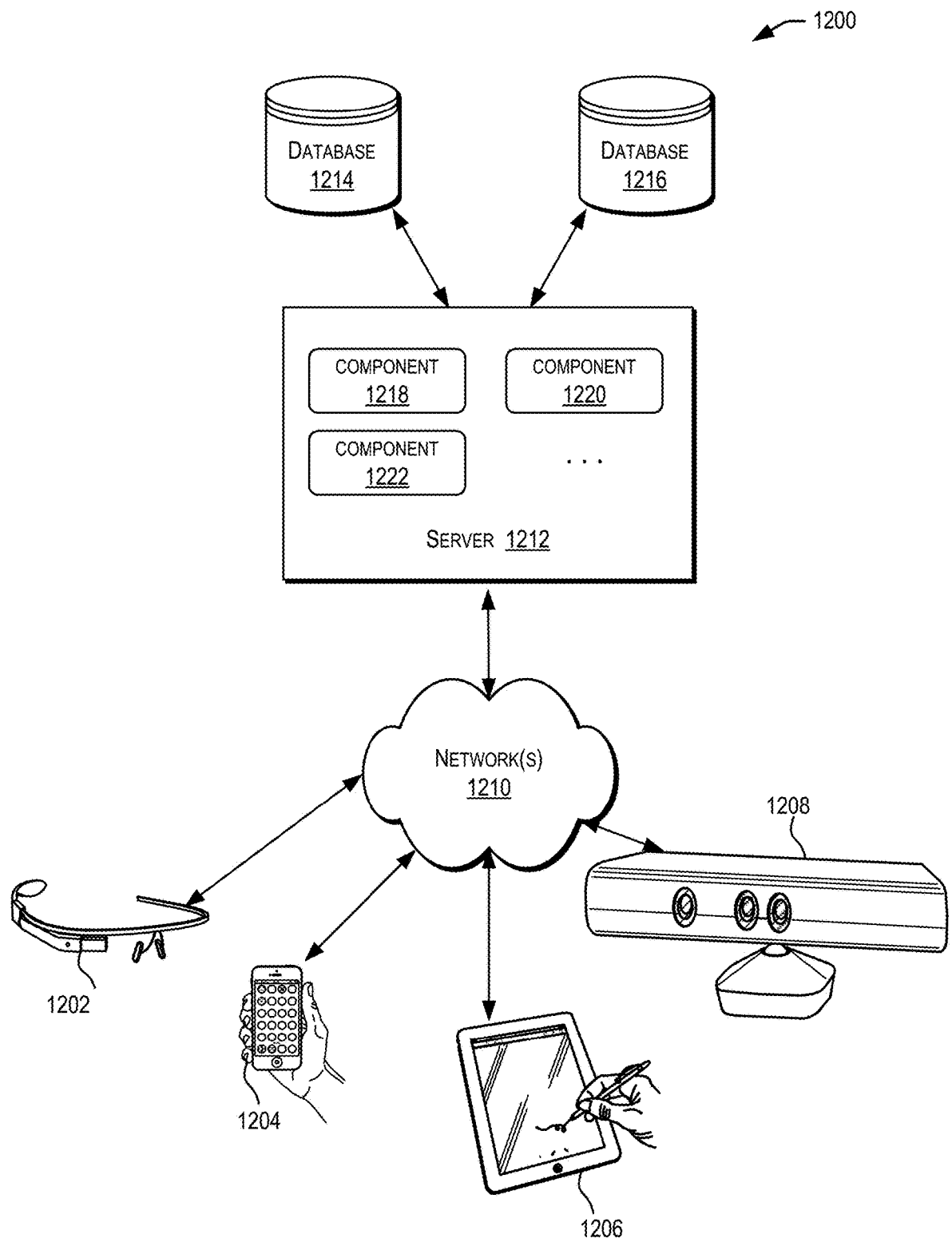
FIG. 12 depicts a simplified diagram of a distributed system, in accordance with some example embodiments.

FIG. 12 depicts a simplified diagram of a distributed system 1200 for implementing an embodiment. In the illustrated embodiment, the distributed system 1200 includes one or more client computing devices 1202, 1204, 1206, and 1208, which are configured to execute and operate a client application such as a web browser, proprietary client (e.g., Oracle Forms), or the like over one or more network(s) 1210. The server 1212 may be communicatively coupled with the remote client computing devices 1202, 1204, 1206, and 1208 via network 1210.

In various embodiments, the server 1212 may be adapted to run one or more services or software applications such as services and applications that provide message delivery services. In certain embodiments, the server 1212 may also provide other services or software applications can include non-virtual and virtual environments. In some embodiments, these services may be offered as web-based or cloud services or under a Software as a Service (SaaS) model to the users of the client computing devices 1202, 1204, 1206, and/or 1208. Users operating the client computing devices 1202, 1204, 1206, and/or 1208 may in turn utilize one or more client applications to interact with the server 1212 to utilize the services provided by these components.

In the configuration depicted in FIG. 12, the software components 1218, 1220 and 1222 of system 1200 are shown as being implemented on the server 1212. In other embodiments, one or more of the components of the system 1200 and/or the services provided by these components may also be implemented by one or more of the client computing devices 1202, 1204, 1206, and/or 1208. Users operating the client computing devices may then utilize one or more client applications to use the services provided by these components. These components may be implemented in hardware, firmware, software, or combinations thereof. It should be appreciated that various different system configurations are possible, which may be different from distributed system 1200. The embodiment shown in FIG. 12 is thus one example of a distributed system for implementing an embodiment system and is not intended to be limiting.

The client computing devices 1202, 1204, 1206, and/or 1208 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 1210.

Although distributed system 1200 in FIG. 12 is shown with four client computing devices, any number of client computing devices may be supported. Other devices, such as devices with sensors, etc., may interact with the server 1212.

The network(s) 1210 in the distributed system 1200 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 1210 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 1212 can include one or more virtual machines running virtual operating systems, or other computing architectures involving virtualization. One or more flexible pools of logical storage devices can be virtualized to maintain virtual storage devices for the server. Virtual networks can be controlled by the server 1212 using software defined networking. In various embodiments, the server 1212 may be adapted to run one or more services or software applications described in the foregoing disclosure. For example, the server 1212 may correspond to a server for performing processing as described above according to an embodiment of the present disclosure.

The server 1212 may run an operating system including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Example database servers include without limitation those commercially available from Oracle, Microsoft, Sybase, IBM (International Business Machines), and the like.

In some implementations, the server 1212 may include one or more applications to analyze and consolidate data feeds and/or event updates received from users of the client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 1212 may also include one or more applications to display the data feeds and/or real-time events via one or more display devices of the client computing devices 1202, 1204, 1206, and 1208.

The distributed system 1200 may also include one or more databases 1214 and 1216. These databases may provide a mechanism for storing information such as inventory information, and other information used by example embodiments. Databases 1214 and 1216 may reside in a variety of locations. By way of example, one or more of databases 1214 and 1216 may reside on a non-transitory storage medium local to (and/or resident in) the server 1212. Alternatively, the databases 1214 and 1216 may be remote from the server 1212 and in communication with the server 1212 via a network-based or dedicated connection. In one set of embodiments, the databases 1214 and 1216 may reside in a storage-area network (SAN). Similarly, any necessary files for performing the functions attributed to the server 1212 may be stored locally on the server 1212 and/or remotely, as appropriate. In one set of embodiments, the databases 1214 and 1216 may include relational databases, such as databases provided by Oracle, that are adapted to store, update, and retrieve data in response to SQL-formatted commands.

Figure 13:
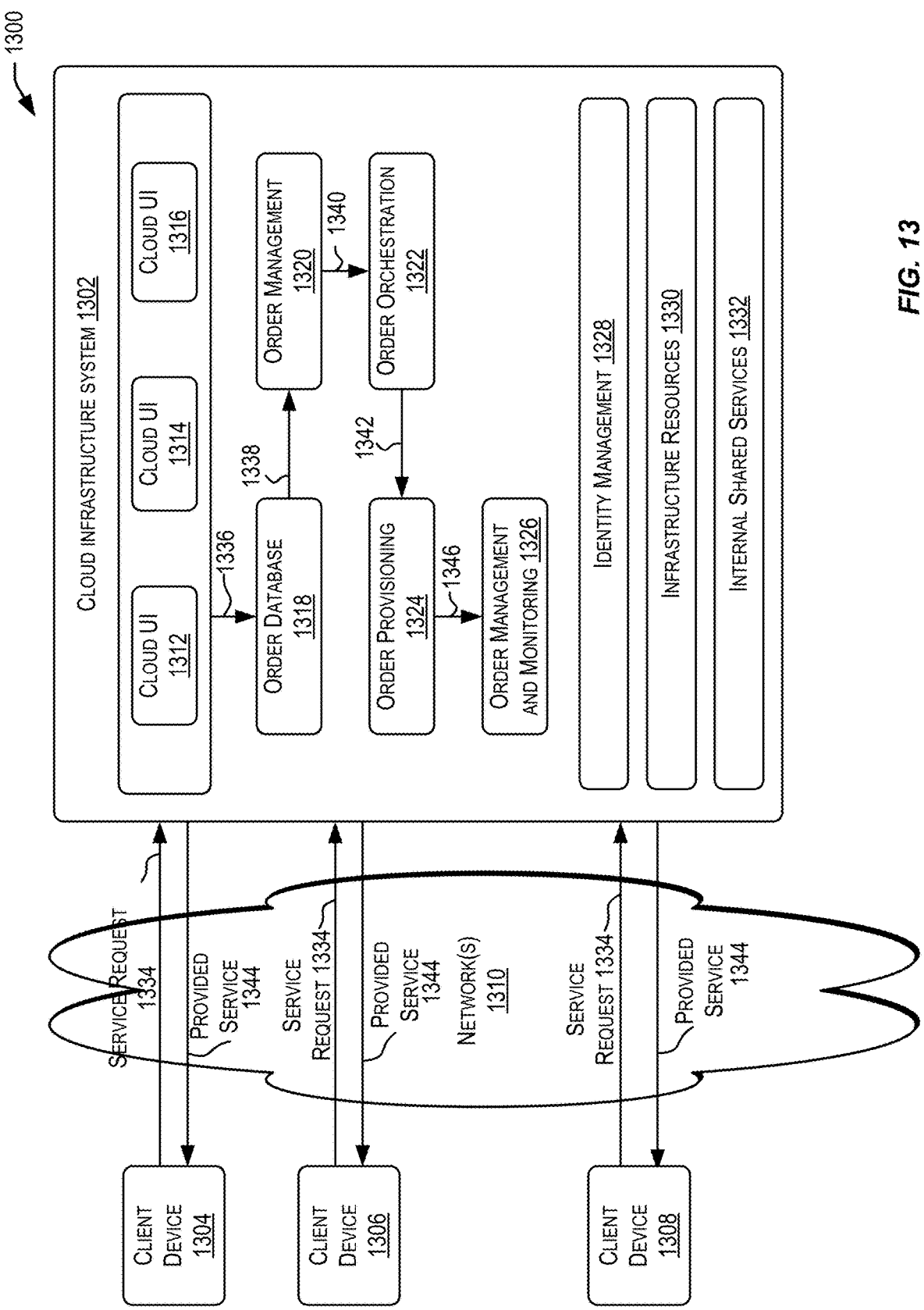
FIG. 13 is a simplified block diagram of one or more components of a system environment in which services may be offered as cloud services, in accordance with some example embodiments.

In some embodiments, the message delivery services described above may be offered as services via a cloud environment. FIG. 13 is a simplified block diagram of one or more components of a system environment 1300 in which services may be offered as cloud services, in accordance with an embodiment of the present disclosure. In the illustrated embodiment in FIG. 13, system environment 1300 includes one or more client computing devices 1304, 1306, and 1308 that may be used by users to interact with a cloud infrastructure system 1302 that provides cloud services, including services for dynamically modifying documents (e.g., webpages) responsive to usage patterns. Cloud infrastructure system 1302 may comprise one or more computers and/or servers that may include those described above for server 312.

It should be appreciated that cloud infrastructure system 1302 depicted in FIG. 13 may have other components than those depicted. Further, the embodiment shown in FIG. 13 is only one example of a cloud infrastructure system that may incorporate an example embodiment. In some other embodiments, cloud infrastructure system 1302 may have more or fewer components than shown in the figure, may combine two or more components, or may have a different configuration or arrangement of components.

Client computing devices 1304, 1306, and 1308 may be devices similar to those described above for 302, 304, 306, and 308. Client computing devices 1304, 1306, and 1308 may be configured to operate a client application such as a web browser, a proprietary client application (e.g., Oracle Forms), or some other application, which may be used by a user of the client computing device to interact with cloud infrastructure system 1302 to use services provided by cloud infrastructure system 1302. Although an example system environment 1300 is shown with three client computing devices, any number of client computing devices may be supported. Other devices such as devices with sensors, etc. may interact with cloud infrastructure system 1302.

Network(s) 1310 may facilitate communications and exchange of data between clients 1304, 1306, and 1308 and cloud infrastructure system 1302. Each network may be any type of network familiar to those skilled in the art that can support data communications using any of a variety of commercially-available protocols, including those described above for network(s) 310.

In certain embodiments, services provided by cloud infrastructure system 1302 may include a host of services that are made available to users of the cloud infrastructure system on demand. In addition to services related to account management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1302 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1302 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1302 may be adapted to automatically provision, manage and track a customer's subscription to services offered by cloud infrastructure system 1302. Cloud infrastructure system 1302 may provide the cloud services via different deployment models. For example, services may be provided under a public cloud model in which cloud infrastructure system 1302 is owned by an organization selling cloud services (e.g., owned by Oracle Corporation) and the services are made available to the general public or different industry enterprises. As another example, services may be provided under a private cloud model in which cloud infrastructure system 1302 is operated solely for a single organization and may provide services for one or more entities within the organization. The cloud services may also be provided under a community cloud model in which cloud infrastructure system 1302 and the services provided by cloud infrastructure system 1302 are shared by several organizations in a related community. The cloud services may also be provided under a hybrid cloud model, which is a combination of two or more different models.

In some embodiments, the services provided by cloud infrastructure system 1302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1302. Cloud infrastructure system 1302 then performs processing to provide the services in the customer's subscription order.

In some embodiments, the services provided by cloud infrastructure system 1302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1302 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1302 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1302 may also include infrastructure resources 1330 for providing the resources used to provide various services to customers of the cloud infrastructure system. In one embodiment, infrastructure resources 1330 may include pre-integrated and optimized combinations of hardware, such as servers, storage, and networking resources to execute the services provided by the PaaS platform and the SaaS platform, and other resources.

In some embodiments, resources in cloud infrastructure system 1302 may be shared by multiple users and dynamically re-allocated per demand. Additionally, resources may be allocated to users in different time zones. For example, cloud infrastructure system 1302 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1332 may be provided that are shared by different components or modules of cloud infrastructure system 1302 to enable provision of services by cloud infrastructure system 1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1302, and the like.

In one embodiment, as depicted in FIG. 13, cloud management functionality may be provided by one or more modules, such as an order management module 1320, an order orchestration module 1322, an order provisioning module 1324, an order management and monitoring module 1326, and an identity management module 1328. These modules may include or be provided using one or more computers and/or servers, which may be general purpose computers, specialized server computers, server farms, server clusters, or any other appropriate arrangement and/or combination.

In an example operation, at 1334, a customer using a client device, such as client device 1304, 1306 or 1308, may interact with cloud infrastructure system 1302 by requesting one or more services provided by cloud infrastructure system 1302 and placing an order for a subscription for one or more services offered by cloud infrastructure system 1302. In certain embodiments, the customer may access a cloud User Interface (UI) such as cloud UI 1312, cloud UI 1314 and/or cloud UI 1316 and place a subscription order via these UIs. The order information received by cloud infrastructure system 1302 in response to the customer placing an order may include information identifying the customer and one or more services offered by the cloud infrastructure system 1302 that the customer intends to subscribe to.

At 1336, the order information received from the customer may be stored in an order database 1318. If this is a new order, a new record may be created for the order. In one embodiment, order database 1318 can be one of several databases operated by cloud infrastructure system 1318 and operated in conjunction with other system elements.

At 1338, the order information may be forwarded to an order management module 1320 that may be configured to perform billing and accounting functions related to the order, such as verifying the order, and upon verification, booking the order.

At 1340, information regarding the order may be communicated to an order orchestration module 1322 that is configured to orchestrate the provisioning of services and resources for the order placed by the customer. In some instances, order orchestration module 1322 may use the services of order provisioning module 1324 for the provisioning. In certain embodiments, order orchestration module 1322 enables the management of business processes associated with each order and applies business logic to determine whether an order should proceed to provisioning.

As shown in the embodiment depicted in FIG. 13, at 1342, upon receiving an order for a new subscription, order orchestration module 1322 sends a request to order provisioning module 1324 to allocate resources and configure resources needed to fulfill the subscription order. Order provisioning module 1324 enables the allocation of resources for the services ordered by the customer. Order provisioning module 1324 provides a level of abstraction between the cloud services provided by cloud infrastructure system 1300 and the physical implementation layer that is used to provision the resources for providing the requested services. This enables order orchestration module 1324 to be isolated from implementation details, such as whether or not services and resources are actually provisioned on the fly or pre-provisioned and only allocated/assigned upon request.

At 1344, once the services and resources are provisioned, a notification may be sent to the subscribing customers indicating that the requested service is now ready for use. In some instance, information (e.g. a link) may be sent to the customer that enables the customer to start using the requested services.

At 1346, a customer's subscription order may be managed and tracked by an order management and monitoring module 1326. In some instances, order management and monitoring module 1326 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1300 may include an identity management module 1328 that is configured to provide identity services, such as access management and authorization services in cloud infrastructure system 1300. In some embodiments, identity management module 1328 may control information about customers who wish to utilize the services provided by cloud infrastructure system 1302. Such information can include information that authenticates the identities of such customers and information that describes which actions those customers are authorized to perform relative to various system resources (e.g., files, directories, applications, communication ports, memory segments, etc.) Identity management module 1328 may also include the management of descriptive information about each customer and about how and by whom that descriptive information can be accessed and modified.

Figure 14:
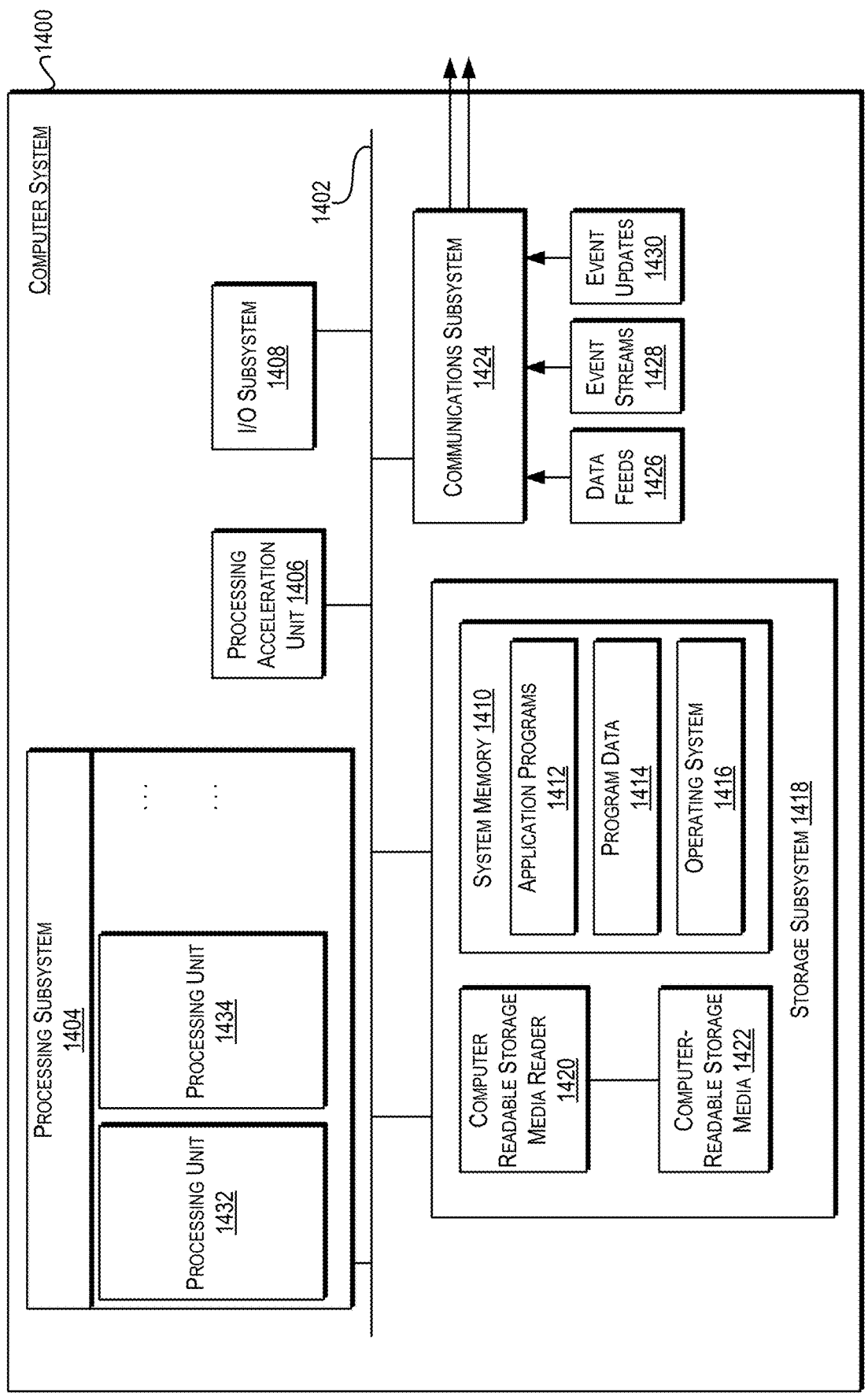
FIG. 14 illustrates a computer system that may be used to implement some of the example embodiments.

FIG. 14 illustrates an example computer system 1400 that may be used to implement an example embodiment. In some embodiments, computer system 1400 may be used to implement any of the various servers and computer systems described above. As shown in FIG. 14, computer system 1400 includes various subsystems including a processing subsystem 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 may include tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1404 controls the operation of computer system 1400 and may comprise one or more processing units 1432, 1434, etc. A processing unit may include be one or more processors, including single core or multicore processors, one or more cores of processors, or combinations thereof. In some embodiments, processing subsystem 1404 can include one or more special purpose co-processors such as graphics processors, digital signal processors (DSPs), or the like. In some embodiments, some or all of the processing units of processing subsystem 1404 can be implemented using customized circuits, such as application specific integrated circuits (ASICs), or field programmable gate arrays (FPGAs).

In some embodiments, the processing units in processing subsystem 1404 can execute instructions stored in system memory 1410 or on computer readable storage media 1422. In various embodiments, the processing units can execute a variety of programs or code instructions and can maintain multiple concurrently executing programs or processes. At any given time, some or all of the program code to be executed can be resident in system memory 1410 and/or on computer-readable storage media 1410 including potentially on one or more storage devices. Through suitable programming, processing subsystem 1404 can provide various functionalities described above for dynamically modifying documents (e.g., webpages) responsive to usage patterns.

In certain embodiments, a processing acceleration unit 1406 may be provided for performing customized processing or for off-loading some of the processing performed by processing subsystem 1404 so as to accelerate the overall processing performed by computer system 1400.

I/O subsystem 1408 may include devices and mechanisms for inputting information to computer system 1400 and/or for outputting information from or via computer system 1400. In general, use of the term "input device" is intended to include all possible types of devices and mechanisms for inputting information to computer system 1400. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1418 provides a repository or data store for storing information that is used by computer system 1400. Storage subsystem 1418 provides a tangible non-transitory computer-readable storage medium for storing the basic programming and data constructs that provide the functionality of some embodiments. Software (programs, code modules, instructions) that when executed by processing subsystem 1404 provide the functionality described above may be stored in storage subsystem 1418. The software may be executed by one or more processing units of processing subsystem 1404. Storage subsystem 1418 may also provide a repository for storing data used in accordance with the example embodiments.

Storage subsystem 1418 may include one or more non-transitory memory devices, including volatile and non-volatile memory devices. As shown in FIG. 14, storage subsystem 1418 includes a system memory 1410 and a computer-readable storage media 1422. System memory 1410 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1400, such as during start-up, may typically be stored in the ROM. The RAM typically contains data and/or program modules that are presently being operated and executed by processing subsystem 1404. In some implementations, system memory 1410 may include multiple different types of memory, such as static random access memory (SRAM) or dynamic random access memory (DRAM).

By way of example, and not limitation, as depicted in FIG. 14, system memory 1410 may store application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1422 may store programming and data constructs that provide the functionality of some embodiments. Software (programs, code modules, instructions) that when executed by processing subsystem 1404 a processor provide the functionality described above may be stored in storage subsystem 1418. By way of example, computer-readable storage media 1422 may include non-volatile memory such as a hard disk drive, a magnetic disk drive, an optical disk drive such as a CD ROM, DVD, a Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1422 may provide storage of computer-readable instructions, data structures, program modules, and other data for computer system 1400.

In certain embodiments, storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for storing computer-readable information.

In certain embodiments, computer system 1400 may provide support for executing one or more virtual machines. Computer system 1400 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1400. Accordingly, multiple operating systems may potentially be run concurrently by computer system 1400. Each virtual machine generally runs independently of the other virtual machines.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to establish a communication channel to one or more client devices via the Internet for receiving and sending information from and to the client devices.

Communication subsystem 1424 may support both wired and/or wireless communication protocols. For example, in certain embodiments, communications subsystem 1424 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

Communication subsystem 1424 can receive and transmit data in various forms. For example, in some embodiments, communications subsystem 1424 may receive input communication in the form of structured and/or unstructured data feeds 1426, event streams 1428, event updates 1430, and the like. For example, communications subsystem 1424 may be configured to receive (or send) data feeds 1426 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1424 may be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1400 depicted in FIG. 14 is intended only as a specific example. Many other configurations having more or fewer components than the system depicted in FIG. 14 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the example embodiments. The example embodiments are not restricted to operation within certain specific data processing environments, but are free to operate within a plurality of data processing environments. Additionally, although example embodiments have been described using a particular series of transactions and steps, it should be apparent to those skilled in the art that the scope of the example embodiments are not limited to the described series of transactions and steps. Various features and aspects of the above-described embodiments may be used individually or jointly.

Further, while example embodiments have been described using a particular combination of hardware and software, it should be recognized that other combinations of hardware and software are also within the scope of the example embodiments. The example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   obtaining, by a computer including a processor and a memory, metadata content of a metadata object in at least one of a physical layer, a logical layer, or a presentation layer of a first base repository, which is an existing base repository;
   wherein the first base repository is a pre-configured metadata base repository comprising a first plurality of predefined metadata objects for modeling data, wherein the metadata object comprises a type and unique identification (ID),
   wherein the physical layer is configured for importing data, wherein the logical layer is configured for performing model mapping, and wherein the presentation layer is configured to create a presentation hierarchy, and wherein each of the physical layer, the logical layer and the presentation layer comprises the metadata object;
   customizing, by a user, one or more data fields of metadata content of the metadata object by modifying content of the metadata object in at least one of the physical layer, the logical layer, or the presentation layer of the first base repository;
   consolidating the customizations made to the metadata content of the metadata object in the at least one of the physical layer, the logical layer, or the presentation layer of the first base repository;
   generating a consolidated customization file, wherein the consolidated customization file comprises one or more changes to the first plurality of predefined metadata objects in the at least one of the physical layer, the logical layer, or the presentation layer in the first base repository;
   obtaining a second base repository that is a newer version than a version of the first base repository, wherein the second base repository comprises a second plurality of predefined metadata objects for modeling data in at least one of a second physical layer, a second logical layer, or a second presentation layer of the second base repository, wherein the second plurality of predefined metadata objects are different from the first plurality of predefined metadata objects of the first base repository;
   transforming, by the computer without user intervention, the metadata content in the consolidated customization file by updating the unique ID to an updated unique ID so that the metadata content in the consolidated customization file is compatible with the second plurality of predefined metadata objects of the second base repository; and applying the consolidated customization file including the transformed metadata content to the second base repository, wherein the consolidated customization file resolves conflicts between metadata content in the first base repository and the newer second base repository, and ensures that the customizations made to the first base repository are compatible with the second base repository.

2. The method according to claim 1, wherein in response to metadata content being renamed in the second base repository, the transforming the metadata content in the consolidated customization file comprises updating a name of metadata content in the consolidated customization file.

3. The method according to claim 2, wherein the updating the name of metadata content in the consolidated customization file comprises searching for metadata content according to the unique identification (ID) of the metadata content that is renamed and updating the name of the metadata content in the consolidated customization file corresponding to the unique ID.

4. The method according to claim 1, wherein in response to metadata content being deleted in the second base repository, the transforming the metadata content in the consolidated customization file comprises removing references to the deleted metadata content in the consolidated customization file.

5. The method according to claim 4, wherein the removing references to the deleted metadata content in the consolidated customization file comprises identifying metadata content in the consolidated customization file that is deleted in the second base repository and removing references to the deleted metadata content in the consolidated customization file.

6. The method according to claim 1, further comprising validating the transformed metadata content before applying the transformed metadata content to the second base repository.

7. The method according to claim 6, further comprising saving the validated transformed metadata content in a transformed consolidated customization file.

8. The method according to claim 7, wherein applying the transformed metadata content to the second base repository comprises applying the transformed consolidated customization file to the second base repository.

9. The method according to claim 1, wherein the updating the unique ID of metadata content in the consolidated customization file comprises searching for instances of a previous unique ID of the metadata content in the consolidated customization file according to a fully qualified name of the metadata content, and updating the previous unique ID to an updated unique ID of the metadata content.

10. The method according to claim 1, wherein the metadata content comprises an object.

11. The method according to claim 1, wherein metadata content in the second base repository is different from the metadata content in the first base repository.

12. The method according to claim 11, wherein metadata content in the consolidated customization file is transformed in accordance with the second base repository.

13. The method according to claim 1, wherein metadata content in the second base repository is an update to the metadata content in the first base repository.

14. The method according to claim 1, wherein the consolidated customization file comprises only information regarding customizations made on the first base repository.

15. The method according to claim 1, wherein the consolidated customization file comprises customizations in an order in which the customizations were performed.

16. The method according to claim 1, wherein the metadata content is automatically transformed in accordance with the second base repository.

17. The method according to claim 1, wherein the logical layer is configured for creating a model mapping, wherein the physical layer is configured for performing at least one of importing data and physical joins, and wherein the logical layer is configured to create a logical mapping for one or more physical layer objects representing the model.

18. The method according to claim 1, wherein the first base repository comprises an out-of-the-box base repository.

19. A non-transitory computer-readable storage medium storing a plurality of instructions executable by one or more processors, the plurality of instructions comprising:

obtaining, by a computer including the one or more processors and a memory, metadata content of a metadata object in at least one of a physical layer, a logical layer, or a presentation layer of a first base repository, which is an existing base repository;

wherein the first base repository is a pre-configured metadata base repository comprising a first plurality of predefined metadata objects for modeling data, wherein the metadata object comprises a type and unique identification (ID), wherein the physical layer is configured for importing data, wherein the logical layer is configured for performing model mapping, and wherein the presentation layer is configured to create a presentation hierarchy, and wherein each of the physical layer, logical layer and presentation layer comprises the metadata object;

customizing, by a user, one or more data fields of metadata content of the metadata object by modifying content of the metadata object in at least one of the physical layer, the logical layer, or the presentation layer of the first base repository;

consolidating the customizations made to the metadata content of the metadata object in the at least one of the physical layer, the logical layer, or the presentation layer of the first base repository;

generating a consolidated customization file, wherein the consolidated customization file comprises one or more changes to the first plurality of predefined metadata objects in the at least one of the physical layer, the logical layer, or the presentation layer in the first base repository;

obtaining a second base repository that is a newer version than a version of the first base repository, wherein the second base repository comprises a second plurality of predefined metadata objects for modeling data in at least one of a second physical layer, a second logical layer, or a second presentation layer of the second base repository, wherein the second plurality of predefined metadata objects are different from the first plurality of predefined metadata objects of the first base repository;

transforming, by the processor without user intervention, the metadata content in the consolidated customization file by updating the unique ID to an updated unique ID so that the metadata content in the consolidated customization file is compatible with the second plurality of predefined metadata objects of the second base repository; and applying the consolidated customization file including the transformed metadata content to the second base repository, wherein the consolidated customization file resolves conflicts between metadata content in the first base repository and the newer second base repository, and ensures that the customizations made to the first base repository are compatible with the second base repository.

20. A system comprising:

one or more processors; and a memory coupled with and readable by the one or more processors, the memory configured to store a set of instructions which, when executed by the one or more processors, causes the one or more processors to:

obtain metadata content of a metadata object in at least one of a physical layer, a logical layer, or a presentation layer of a first base repository, which is an existing base repository;

wherein the first base repository is a pre-configured metadata base repository comprising a first plurality of predefined metadata objects for modeling data, wherein the metadata object comprises a type and unique identification (ID), wherein the physical layer is configured for importing data, wherein the logical layer is configured for performing model mapping, and wherein the presentation layer is configured to create a presentation hierarchy, and wherein each of the physical layer, logical layer and presentation layer comprises the metadata object;

customize, by a user, one or more data fields of metadata content of the metadata object by modifying content of the metadata object in at least one of the physical layer, the logical layer, or the presentation layer of the first base repository;

consolidate the customizations made to the metadata content of the metadata object in the at least one of the physical layer, the logical layer, or the presentation layer of the first base repository;

generating a consolidated customization file, wherein the consolidated customization file comprises one or more changes to the first plurality of predefined metadata objects in the at least one of the physical layer, the logical layer, or the presentation layer in the first base repository;

obtain a second base repository that is a newer version than a version of the first base repository, wherein the second base repository comprises a second plurality of predefined metadata objects for modeling data in at least one of a second physical layer, a second logical layer, or a second presentation layer of the second base repository, wherein the second plurality of predefined metadata objects are different from the first plurality of predefined metadata objects of the first base repository;

transform, by the one or more processors without user intervention, the metadata content in the consolidated customization file by updating the unique ID to an updated unique ID so that the metadata content in the consolidated customization file is compatible with the second plurality of predefined metadata objects of the second base repository; and apply the consolidated customization file including the transformed metadata content to the second base repository, wherein the consolidated customization file resolves conflicts between metadata content in the first base repository and the newer second base repository, and ensures that the customizations made to the first base repository are compatible with the second base repository.

* * * * *